United States Patent
Eschenburg et al.

(10) Patent No.: US 10,864,818 B2
(45) Date of Patent: Dec. 15, 2020

(54) METHOD OF CONTROLLING A DRIVE AXLE SYSTEM

(71) Applicant: ArvinMeritor Technology, LLC, Troy, MI (US)

(72) Inventors: Dale Eschenburg, Rochester Hills, MI (US); Brian D. Hayes, Newark, OH (US); Robert J. Martin, Harrison Township, MI (US); Phillip Leicht, South Lyon, MI (US); Pedro Garcia, Clarkston, MI (US); Christopher Keeney, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 164 days.

(21) Appl. No.: 16/190,818

(22) Filed: Nov. 14, 2018

(65) Prior Publication Data
US 2020/0148058 A1    May 14, 2020

(51) Int. Cl.
| | | |
|---|---|---|
| *B60K 17/35* | (2006.01) | |
| *B60K 17/02* | (2006.01) | |
| *B60K 23/04* | (2006.01) | |
| *B60K 17/16* | (2006.01) | |
| *B60K 17/346* | (2006.01) | |
| *B60K 17/04* | (2006.01) | |

(52) U.S. Cl.
CPC ............ *B60K 17/35* (2013.01); *B60K 17/02* (2013.01); *B60K 17/046* (2013.01); *B60K 17/16* (2013.01); *B60K 17/3467* (2013.01); *B60K 23/04* (2013.01)

(58) Field of Classification Search
None
See application file for complete search history.

(56) References Cited

U.S. PATENT DOCUMENTS

| | | | |
|---|---|---|---|
| 2,312,263 A | 2/1943 | Ormsby | |
| 3,199,375 A | 8/1965 | Rosen et al. | |
| 4,263,824 A | 4/1981 | Mueller | |
| 4,914,979 A | 4/1990 | Balmforth | |
| 5,092,188 A | 3/1992 | Fujikawa et al. | |
| 5,989,143 A | 11/1999 | Bell et al. | |
| 6,852,058 B2* | 2/2005 | Oates ................ | B60K 17/36 475/221 |

(Continued)

FOREIGN PATENT DOCUMENTS

| | | |
|---|---|---|
| DE | 1430473 A1 | 10/1968 |
| DE | 19805881 A1 | 6/1999 |

(Continued)

OTHER PUBLICATIONS

Dale Eschenburg, et al., U.S. Appl. No. 15/667,677, filed Aug. 3, 2017.

(Continued)

*Primary Examiner* — Colby M Hansen
(74) *Attorney, Agent, or Firm* — Brooks Kushman PC

(57) ABSTRACT

A method of controlling a drive axle system. The drive axle system may include first and second drive axle assemblies. A drive axle assembly may be disconnected by operating a wheel end disconnect to discontinue transmission of torque between a wheel assembly and a differential and by discontinuing the transmission of torque to the differential.

20 Claims, 28 Drawing Sheets

(56) References Cited

U.S. PATENT DOCUMENTS

| | | | |
|---|---|---|---|
| 7,736,238 B2 * | 6/2010 | Kurzeja | F16C 21/005 |
| | | | 464/132 |
| 8,382,633 B2 | 2/2013 | Cooper et al. | |
| 8,398,520 B1 | 3/2013 | Bassi et al. | |
| 8,523,738 B2 | 9/2013 | Morscheck et al. | |
| 8,562,479 B2 | 10/2013 | Hamperl et al. | |
| 8,651,994 B2 | 2/2014 | Bassi et al. | |
| 8,845,473 B2 | 9/2014 | Nett et al. | |
| 8,851,212 B2 | 10/2014 | Kahl | |
| 8,911,321 B2 | 12/2014 | Ziech et al. | |
| 9,020,715 B2 | 4/2015 | Nellums et al. | |
| 9,102,232 B2 | 8/2015 | Ziech et al. | |
| 9,109,635 B2 | 8/2015 | Boothby et al. | |
| 9,121,455 B2 | 9/2015 | Cooper | |
| 9,284,995 B2 | 3/2016 | Lawson et al. | |
| 9,333,857 B2 | 5/2016 | Morscheck et al. | |
| 9,428,050 B2 | 8/2016 | Ziech et al. | |
| 9,457,655 B2 | 10/2016 | Ziech et al. | |
| 9,457,656 B2 | 10/2016 | Ziech et al. | |
| 9,457,657 B2 | 10/2016 | Ziech et al. | |
| 2002/0187870 A1 | 12/2002 | Staheli et al. | |
| 2011/0218715 A1 | 9/2011 | Duraiswamy et al. | |
| 2012/0202640 A1 * | 8/2012 | Morimoto | B60K 17/046 |
| | | | 475/323 |
| 2013/0085031 A1 | 4/2013 | Bassi et al. | |
| 2014/0141923 A1 | 5/2014 | Forsyth | |
| 2015/0011349 A1 * | 1/2015 | Downs | B60K 17/16 |
| | | | 475/198 |
| 2015/0126320 A1 | 5/2015 | Genise et al. | |
| 2015/0247562 A1 | 9/2015 | Valente | |
| 2015/0314678 A1 * | 11/2015 | Ekonen | B60K 17/35 |
| | | | 180/197 |
| 2016/0207397 A1 * | 7/2016 | Anderson | B60K 17/16 |
| 2016/0280066 A1 | 9/2016 | Tavvala et al. | |
| 2016/0341260 A1 * | 11/2016 | Hirao | F16D 11/14 |
| 2016/0363205 A1 | 12/2016 | Tiziani et al. | |
| 2017/0144540 A1 | 5/2017 | Kincaid et al. | |
| 2018/0147939 A1 | 5/2018 | Sharma et al. | |

FOREIGN PATENT DOCUMENTS

| | | |
|---|---|---|
| DE | 102008015200 A1 | 9/2009 |
| DE | 102008002844 A1 | 11/2009 |
| EP | 3163126 A1 | 5/2017 |
| EP | 3473477 A1 | 4/2019 |
| JP | H0999754 A | 4/1997 |
| WO | 2006004489 A1 | 1/2006 |
| WO | 2011097244 A2 | 8/2011 |
| WO | 2016205480 A1 | 12/2016 |

OTHER PUBLICATIONS

Dale Eschenburg, et al., U.S. Appl. No. 16/059,226, filed Aug. 9, 2018.

Dale Eschenburg, et al., U.S. Appl. No. 16/059,395, filed Aug. 9, 2018.

Dale Eschenburg, et al., U.S. Appl. No. 15/964,780, filed Apr. 27, 2018.

European Patent Office, Extended European Search Report for corresponding European Application No. 19190449.9-1012, dated Sep. 19, 2019.

* cited by examiner

METHOD OF CONTROLLING A DRIVE AXLE SYSTEM

TECHNICAL FIELD

This disclosure relates to a method of controlling a drive axle system that may have a drive axle assembly that may have a planetary interaxle differential unit.

BACKGROUND

A drive axle system having an inter-axle differential that is a planetary differential is disclosed in U.S. Pat. No. 8,523,738.

SUMMARY

In at least one embodiment, a method of controlling a drive axle system is provided. The method may include providing an axle assembly that may have an interaxle differential unit, a shift collar, a differential, a wheel end assembly having a wheel end disconnect, and a wheel assembly. The interaxle differential unit may be operatively connectable to the differential with the shift collar. The wheel end disconnect may be operated to discontinue the transmission of torque from the differential to the wheel assembly after an input torque is reduced. The shift collar may be shifted to discontinue the transmission of torque to the differential after discontinuing the transmission of torque from the differential to the wheel assembly.

In at least one embodiment, a method of controlling a drive axle system is provided. The method may include providing an axle assembly that may have an interaxle differential unit that is rotatable about a first axis, a shift collar, a differential, first and second axle shafts, a first wheel end assembly having a first wheel end disconnect and a first hub assembly, and a second wheel end assembly having a second wheel end disconnect and a second hub assembly. The differential may be locked such that the first and second axle shafts may rotate together about an axis. The first and second wheel end disconnects may be operated to enable torque transmission between the first and second hub assemblies and the differential. An input torque to the interaxle differential unit may be reduced. The shift collar may then be shifted to enable the transmission of torque to the differential from the interaxle differential unit.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
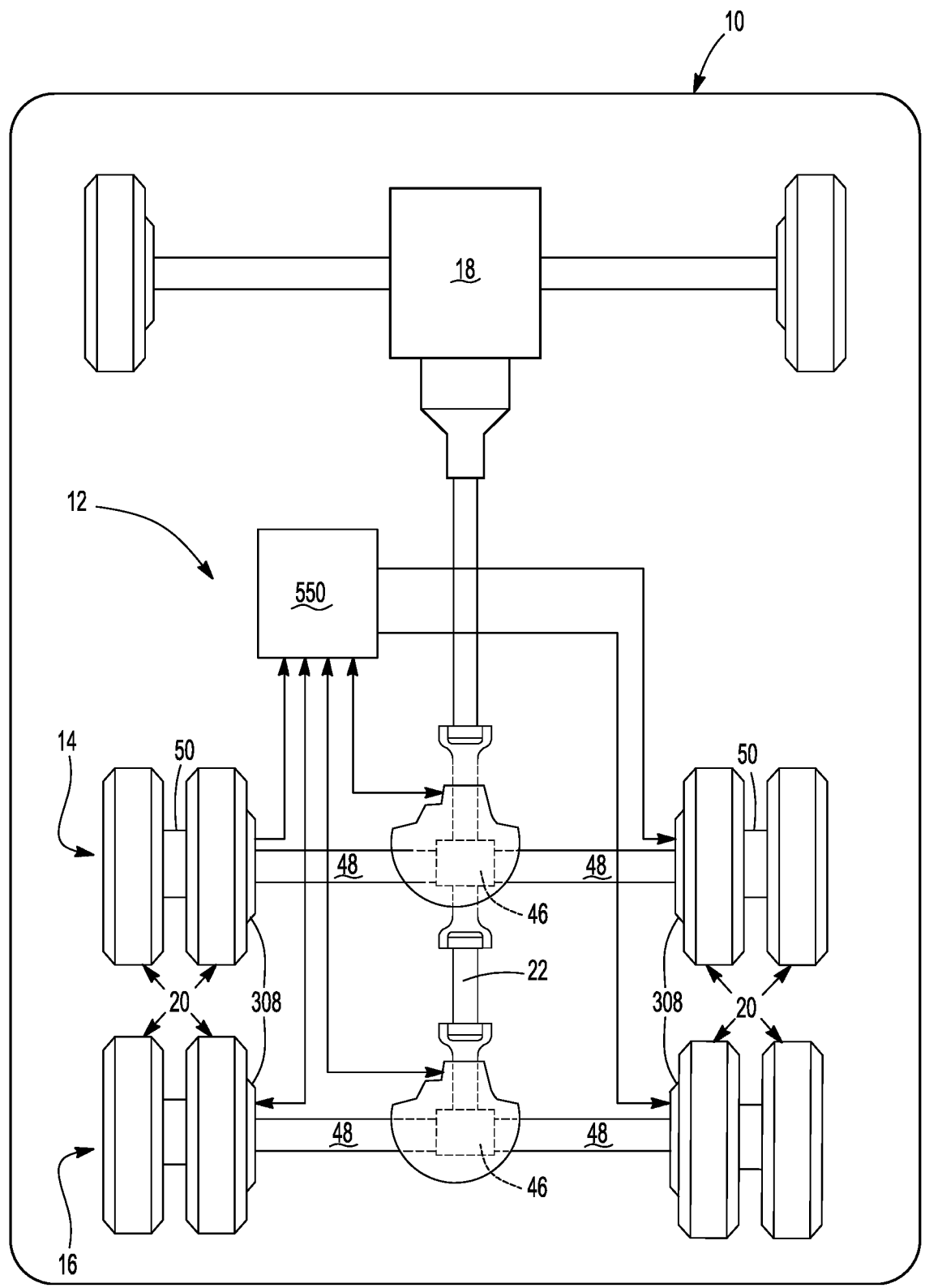
FIG. 1 illustrates an example of a drive axle system.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments.

The vehicle 10 may have a drive axle system 12 that may include a plurality of axle assemblies, such as a first drive axle assembly 14 and a second drive axle assembly 16. A drive axle assembly may be part of a vehicle drivetrain and may receive torque from at least one torque source 18, such as an engine, electric motor, transmission, transfer case, or another axle assembly. A drive axle assembly may provide torque to one or more wheel assemblies 20, such as a tire disposed on a wheel, that may be rotatably supported on the drive axle assembly.

In FIG. 1, two drive axle assemblies are shown in a tandem axle configuration, although it is contemplated that a different number of axle assemblies may be provided. In a tandem configuration, the first drive axle assembly 14, which may also be referred to as may be referred to as a forward-rear drive axle assembly, may be connected in series with the second drive axle assembly 16, which may also be referred to as a rear-rear drive axle assembly. The first drive axle assembly 14 may be operatively connected to the torque source 18, such as with a drive shaft or other input. An output of the first drive axle assembly 14 may be coupled to an input of the second drive axle assembly 16, such as with a prop shaft 22. The prop shaft 22 may be coupled to the output of the first drive axle assembly 14 and the input of the second drive axle assembly 16 at opposing ends via couplings, such as universal joints, that may allow the first drive axle assembly 14 and the second drive axle assembly 16 to move with respect to each other while allowing the prop shaft 22 to rotate.

As will be discussed in more detail below, torque may be selectively provided to the wheel assemblies 20 of at least one of the drive axle assemblies. For example, torque may be provided to the first drive axle assembly 14 and the second drive axle assembly 16 and to their associated wheel assemblies 20 to provide sufficient torque to propel the vehicle 10 from a stationary position, when climbing a road grade, or to provide sufficient torque to meet acceleration demands. Torque may not be provided to the wheel assemblies 20 of the first drive axle assembly 14 or the wheel assemblies 20 of the second drive axle assembly 16 when torque demands are sufficiently low, such as when the vehicle is at a road cruise speed or when torque from one axle assembly is sufficient to meet propulsion or acceleration demands. Not providing torque to either the first drive axle assembly 14 or the second drive axle assembly 16 may help improve axle operating efficiency and fuel economy. Torque may not be provided to the wheel assemblies 20 of a drive axle assembly by (1) not providing torque from the torque source 18 to the differential assembly of the drive axle assembly and optionally by (2) disconnecting the differential assembly from its associated wheel assemblies 20. The combination of disconnecting a differential assembly from the torque source 18 and from its associated wheel assemblies 20 may allow the differential assembly to remain substantially stationary, which may reduce churning losses due to drag forces exerted by lubricant on the ring gear of the differential assembly and may help improve axle operating efficiency.

Figure 2:
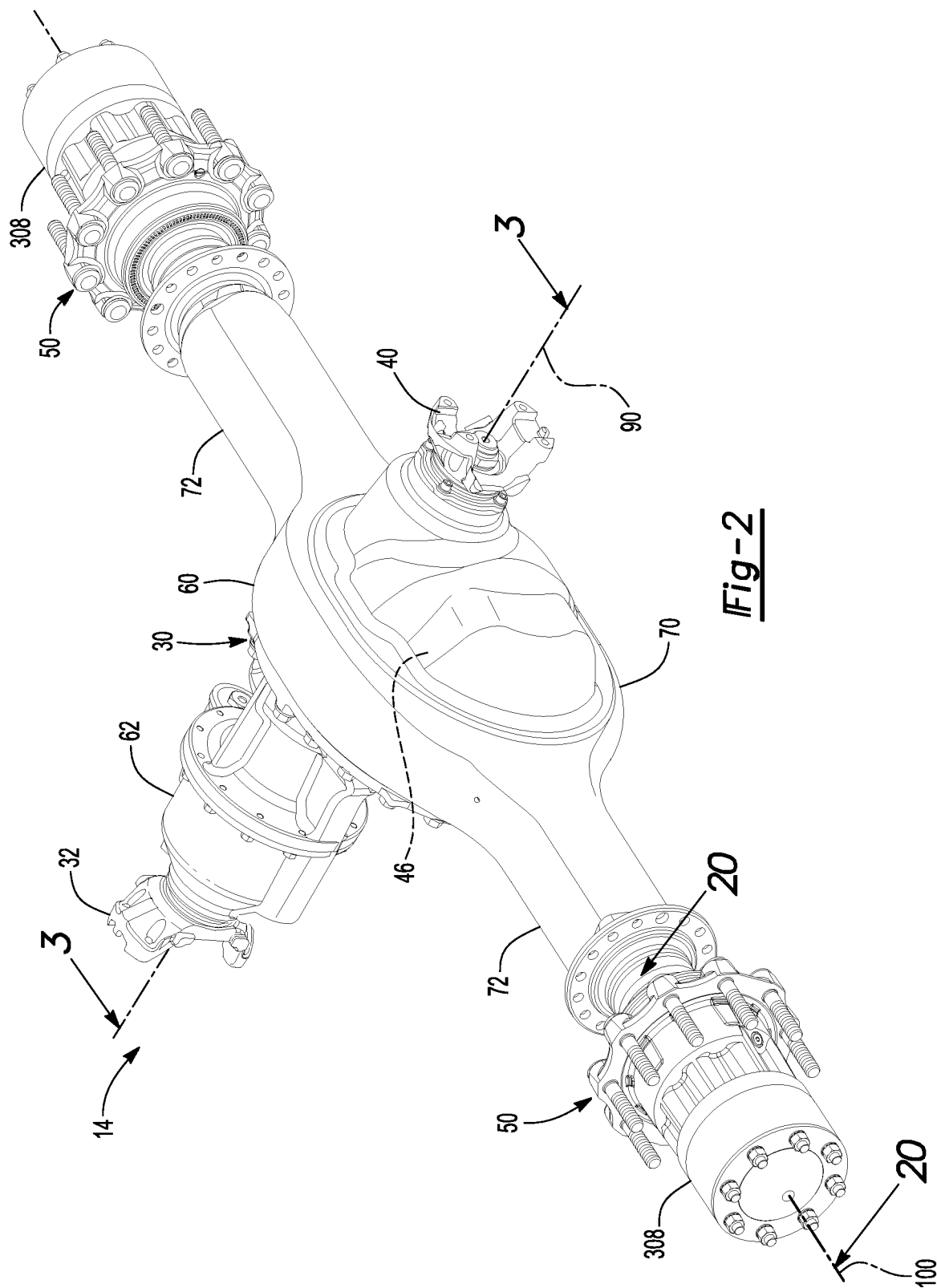
FIG. 2 is a perspective view of an example of a drive axle assembly that may be provided with the drive axle system.

Referring to FIG. 2, an example of a drive axle assembly is shown. The example shown in FIG. 2 is primarily referenced below in the context of being the first drive axle assembly 14; however, it is to be understood that the first drive axle assembly 14 may be provided in other configurations, such as by incorporating a different type of wheel end disconnect or omitting wheel end disconnects. In addition, it is also contemplated that the second drive axle assembly 16 rather than the first drive axle assembly 14 may be provided with a differential that may be disconnectable from the torque source 18 and from its associated wheel assemblies 20 in one or more configurations and may include wheel end disconnects rather than the first drive axle assembly 14. In the configuration shown in FIG. 2, the axle assembly may include a housing assembly 30, an input yoke 32, an input shaft 34, a drive pinion 36, an output shaft 38, an output yoke 40, an interaxle differential unit 42, a shift collar 44, a differential 46, a pair of axle shafts 48, and a pair of wheel end assemblies 50 that may each include a wheel end disconnect.

Referring to FIG. 2, the housing assembly 30 may receive various components of the axle assembly. In addition, the housing assembly 30 may facilitate mounting of the axle assembly to the vehicle. The housing assembly 30 may include an axle housing 60 and a differential carrier 62.

The axle housing 60 may receive and support the axle shafts 48. In at least one embodiment, the axle housing 60 may include a center portion 70 and at least one arm portion 72.

The center portion 70 may be disposed proximate the center of the axle housing 60. The center portion 70 may define a cavity that may receive the differential 46. A lower region of the center portion 70 may at least partially define a sump portion that may contain lubricant. Splashed lubricant may flow down the sides of the center portion 70 and may flow over internal components of the axle assembly and collect in the sump portion.

One or more arm portions 72 may extend from the center portion 70. For example, two arm portions 72 may extend in opposite directions from the center portion 70 and away from the differential 46. The arm portions 72 may have substantially similar configurations. For example, the arm portions 72 may each have a hollow configuration or tubular configuration that may extend around and may receive the corresponding axle shaft 48 and may help separate or isolate the axle shaft 48 from the surrounding environment. An arm portion 72 or a portion thereof may be integrally formed with the center portion 70 or may be separate from the center portion 70. Each arm portion 72 may define an arm cavity that may receive a corresponding axle shaft 48. In addition, each arm portion 72 may include a spindle 74.

Figure 5:
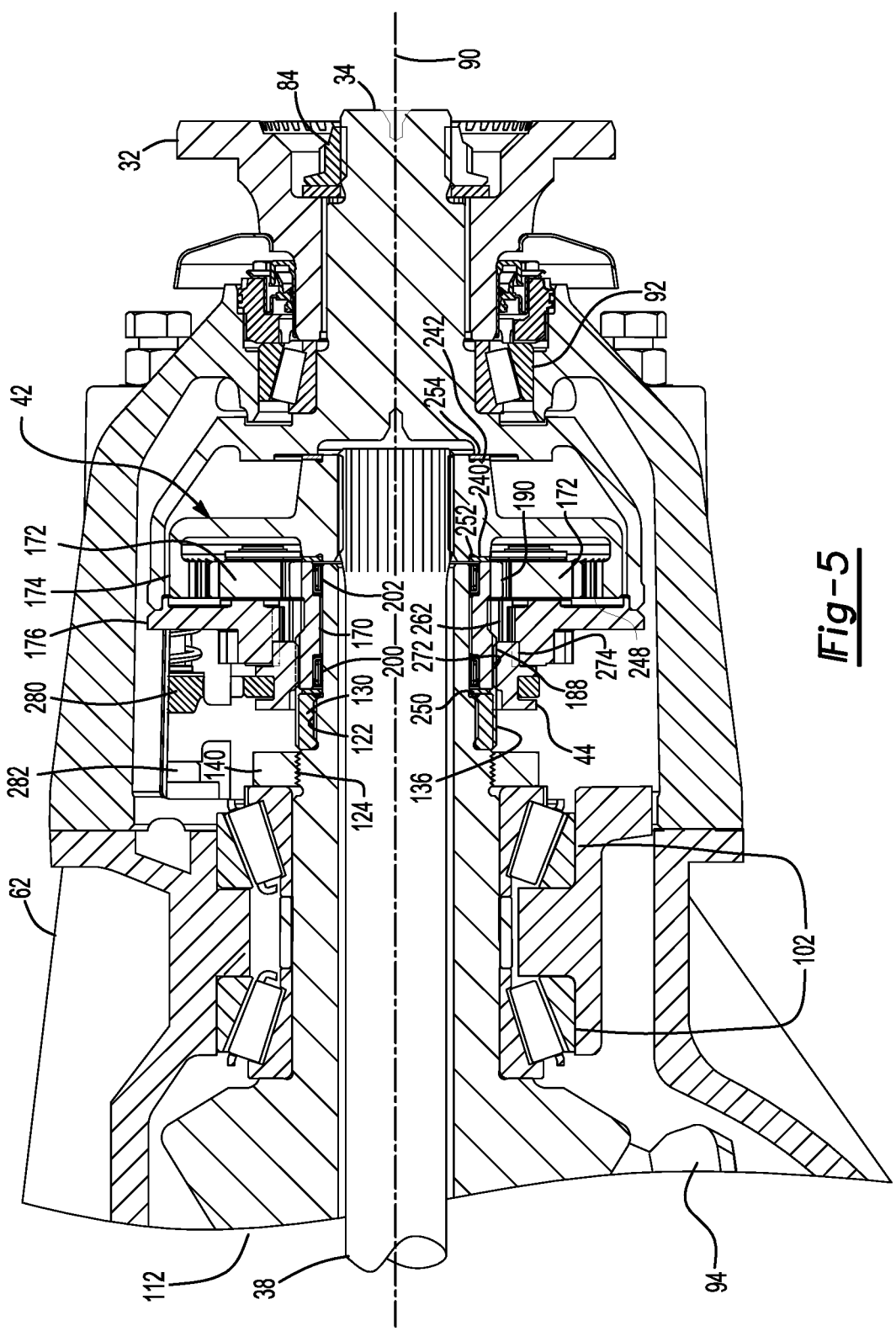
FIG. 5 is a magnified view of the portion of the drive axle assembly with the shift collar in a second position.

Referring to FIGS. 1 and 5, the spindle 74 may be disposed at an end of each arm portion 72 that may be disposed opposite the center portion 70. The spindle 74 may be integrally formed with the arm portion 72 or may be provided as a separate component that is attached to an arm portion 72. The spindle 74 may extend around or may be centered about an axis and may define a hole through which the axle shaft 48 may extend. In addition, the spindle 74 may rotatably support a hub of a wheel end assembly as will be discussed in more detail below. In at least one configuration, the spindle may include a threaded portion that may extend around an exterior surface of the spindle 74. The threaded portion 76 may be disposed proximate a spindle end surface 78 that may be disposed at a distal end of the spindle 74.

Figure 3:
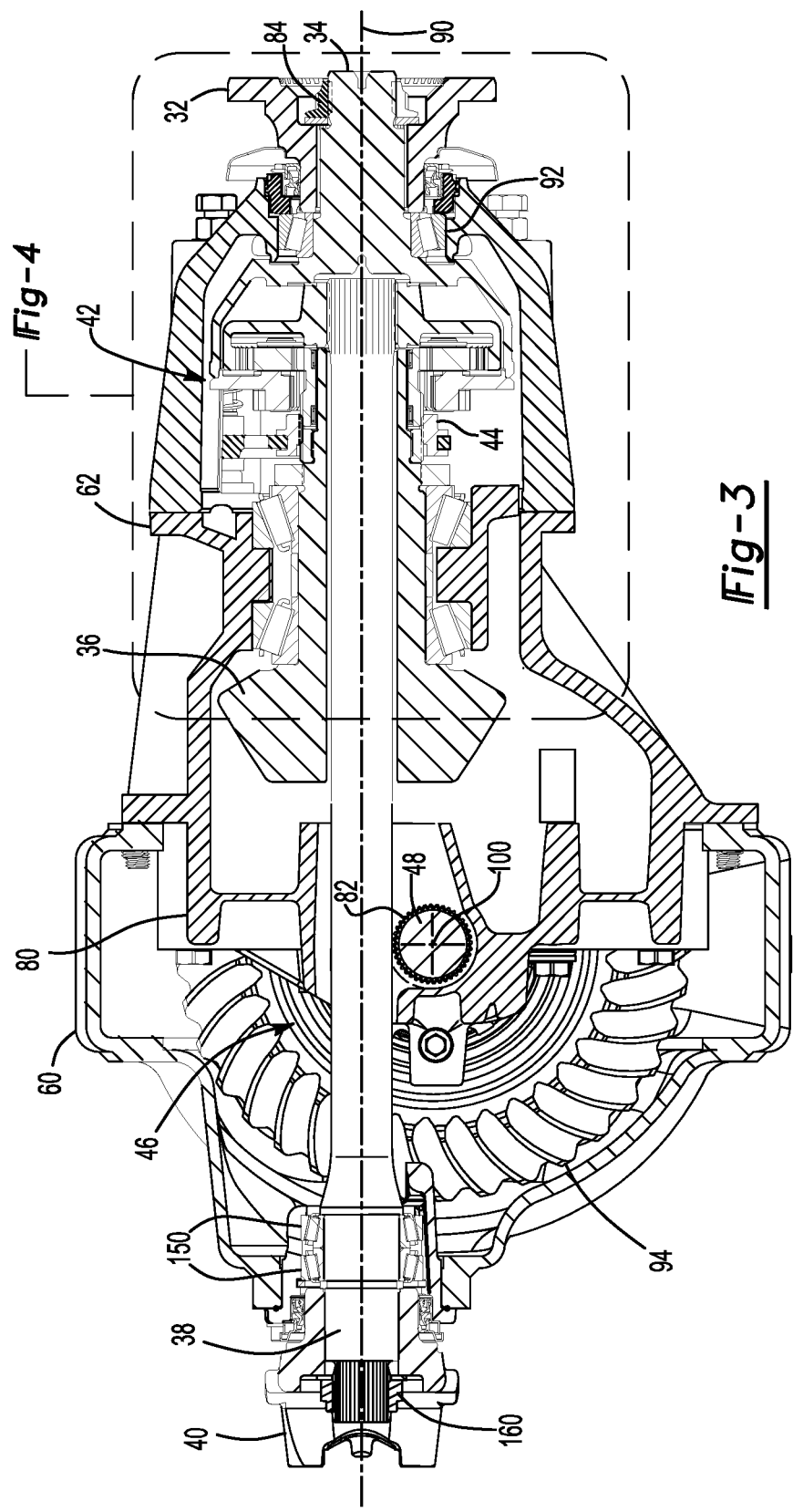
FIG. 3 is a section view of the drive axle assembly of FIG. 2 along section line 3-3.

Referring to FIGS. 2 and 3, the differential carrier 62, which may also be called a carrier housing, may be mounted to the center portion 70 of the axle housing 60. The differential carrier 62 may receive the interaxle differential unit 42 and support components of the differential 46. As is best shown in FIG. 3, the differential carrier 62 may have one or more bearing supports 80.

The bearing support 80 may support or receive a roller bearing assembly 82 that may rotatably support the differential 46. For example, two bearing supports 80 may be received in the center portion 70 and may be located proximate opposite sides of the differential 46.

Figure 6:
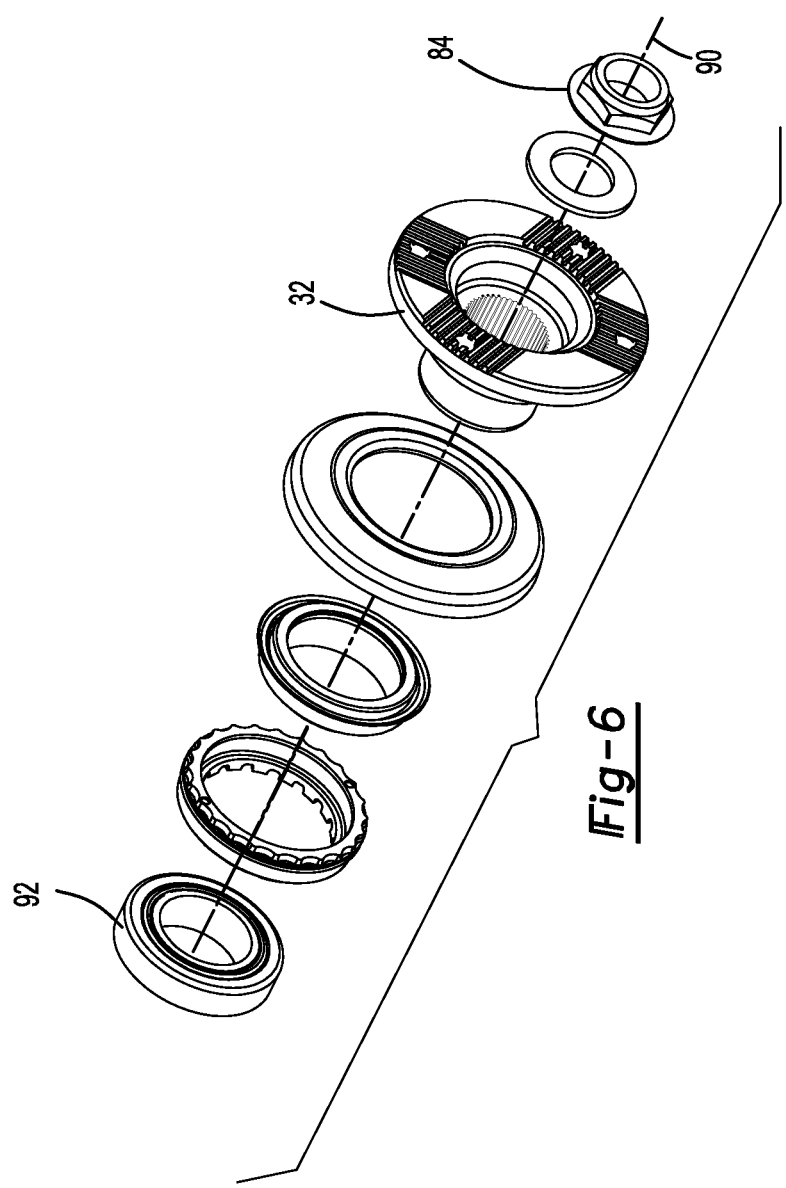
FIGS. 6-8 are exploded views of a portion of the drive axle assembly shown in FIG. 3 without a differential carrier.
Figure 9:
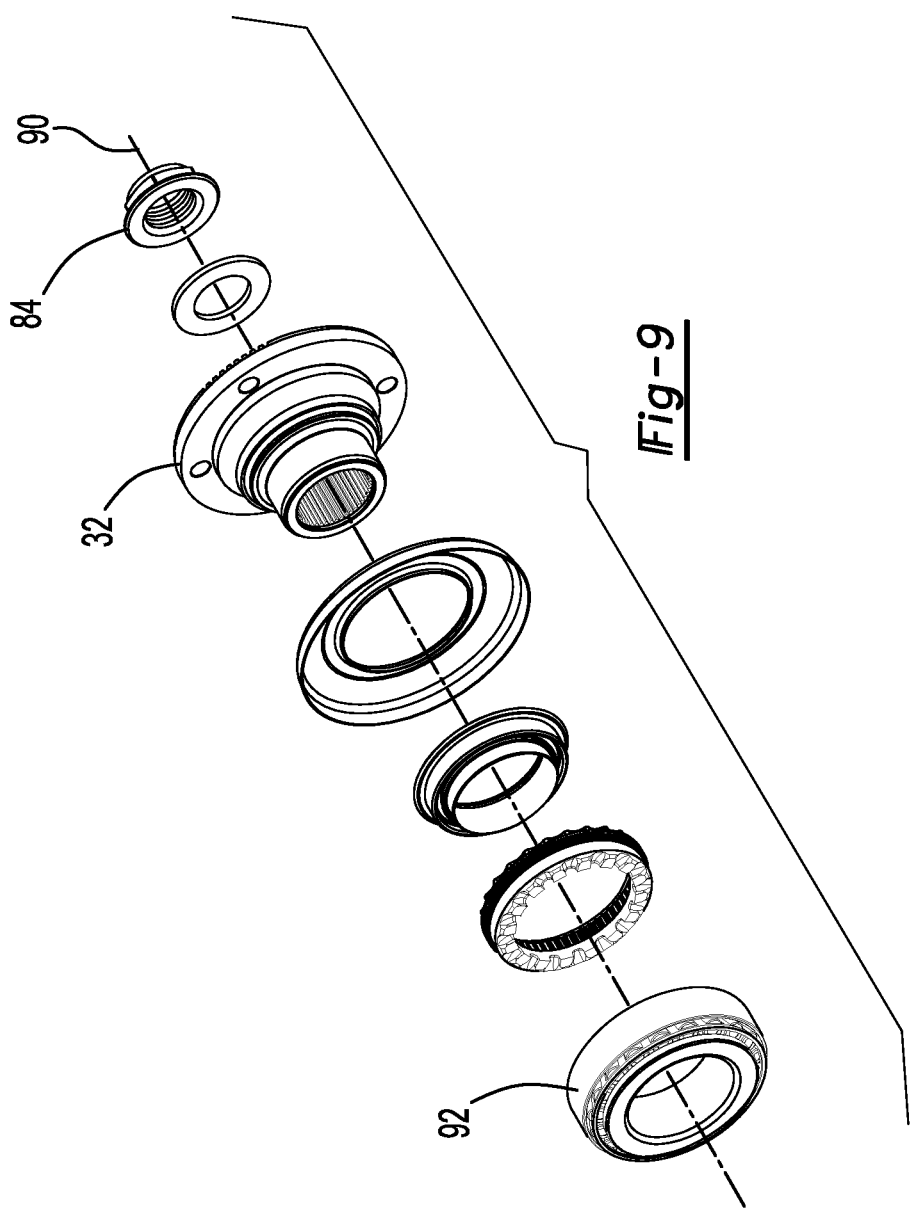
FIGS. 9-11 are exploded views that show the opposite sides of the components shown in FIGS. 6-8.

Referring to FIGS. 3, 6 and 9, the input yoke 32 may facilitate coupling of the first drive axle assembly 14 to the torque source 18. For example, the input yoke 32 may be coupled to the drive shaft that may be coupled to the torque source 18. The input yoke 32 may be mounted on the input shaft 34 as is best shown in FIG. 3. For example, the input yoke 32 may have an opening that receives the input shaft 34 and may be secured to the input shaft 34 with a fastener such as a nut 84.

Figure 7:
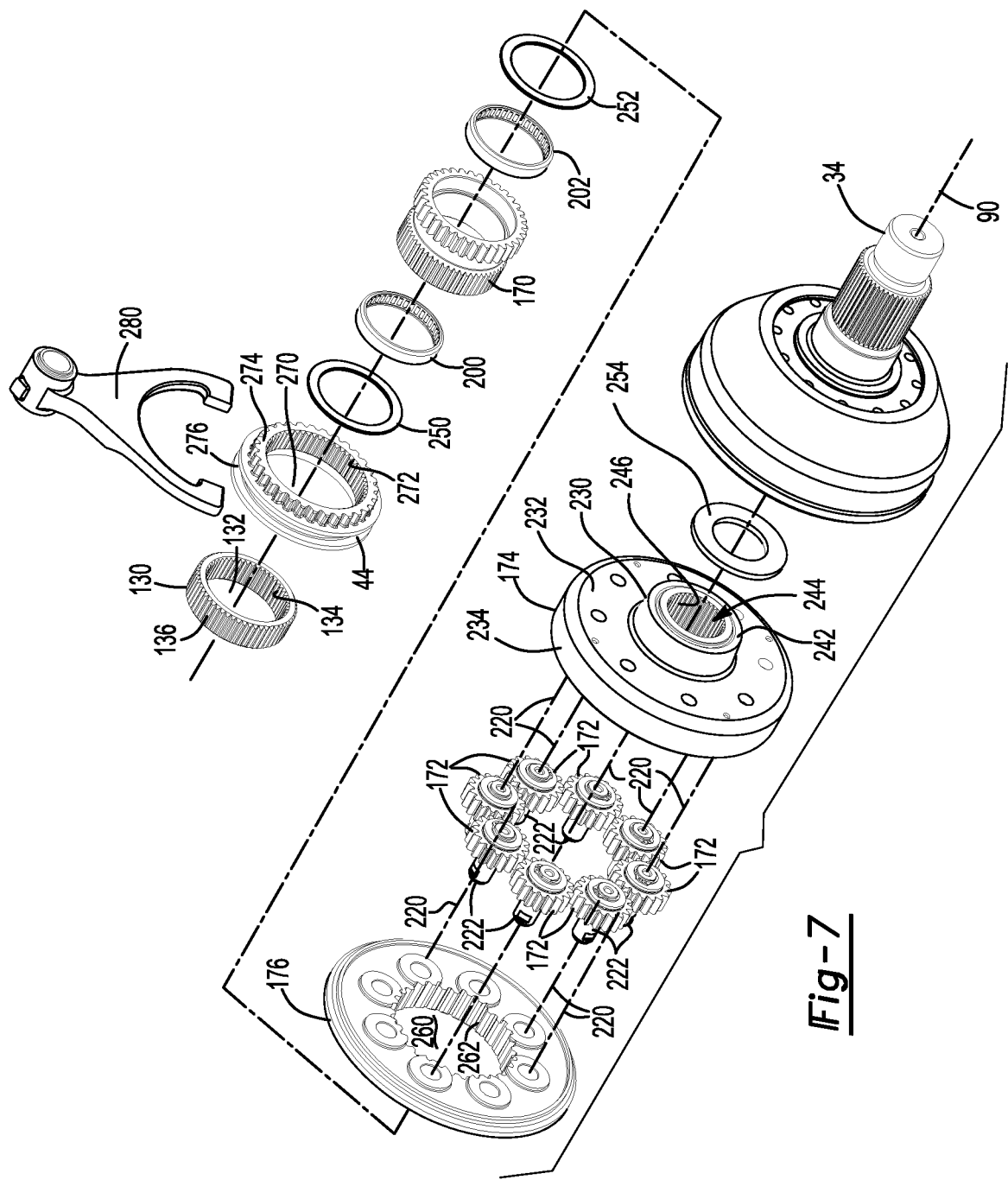
Figure 10:
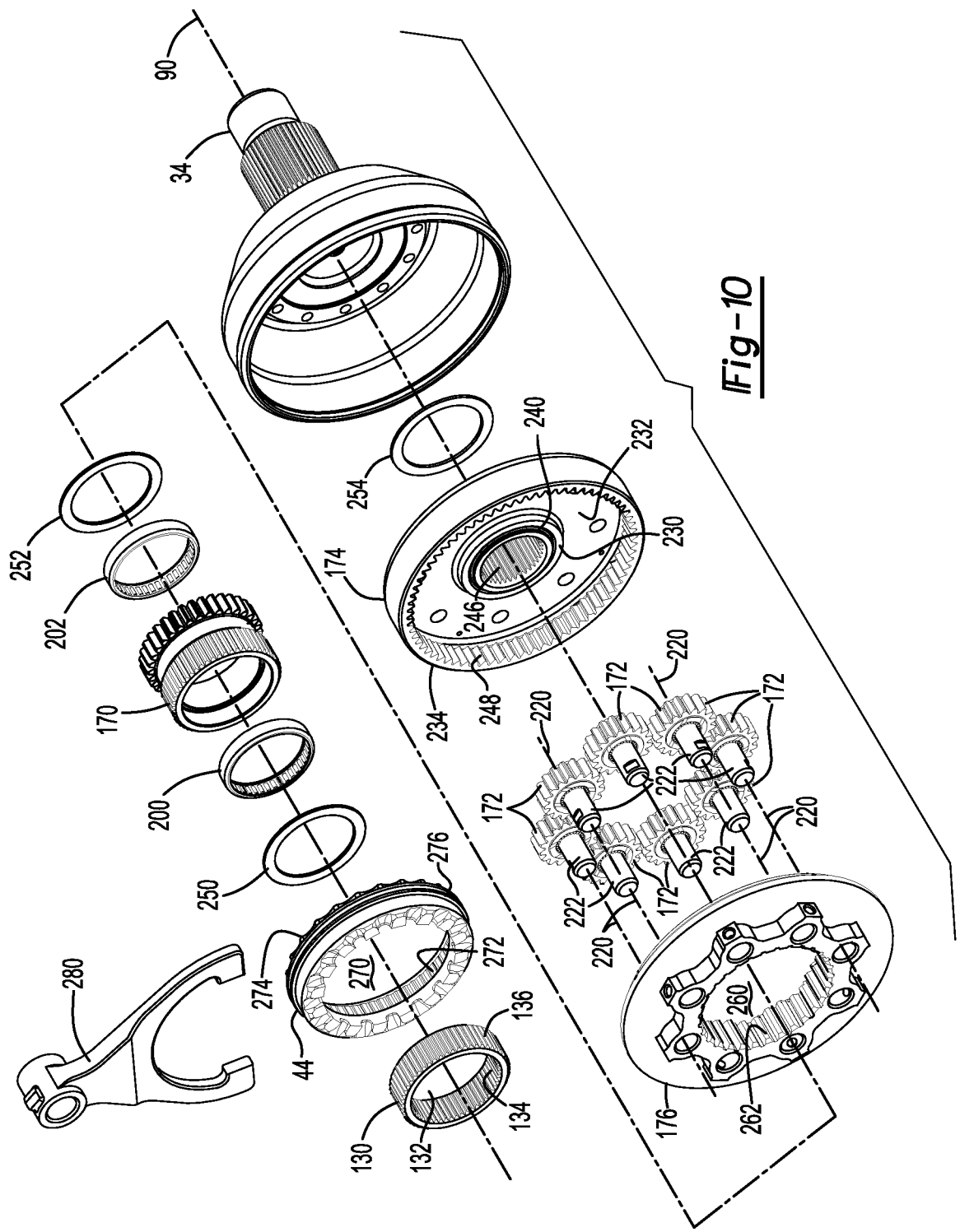

Referring to FIGS. 3, 7 and 10, the input shaft 34 may extend along and may be configured to rotate about a first axis 90. For example, the input shaft 34 may be rotatably supported at least one roller bearing assembly, which may be referred to as an input bearing 92, that may be disposed on the differential carrier 62. The input shaft 34 may be part of the interaxle differential unit 42 or may be operatively connected to the interaxle differential unit 42. For instance, the input shaft 34 may be integrally formed with a case of the interaxle differential unit 42 or may be provided as a separate component that is fixedly coupled to the case in one or more embodiments. As is best shown in FIGS. 3 and 10, the input shaft 34 may be connected to or may have an enlarged cup portion at an end that is disposed opposite the input yoke 32. The cup portion may at least partially define a cavity that may receive components of the interaxle differential unit 42.

Figure 8:
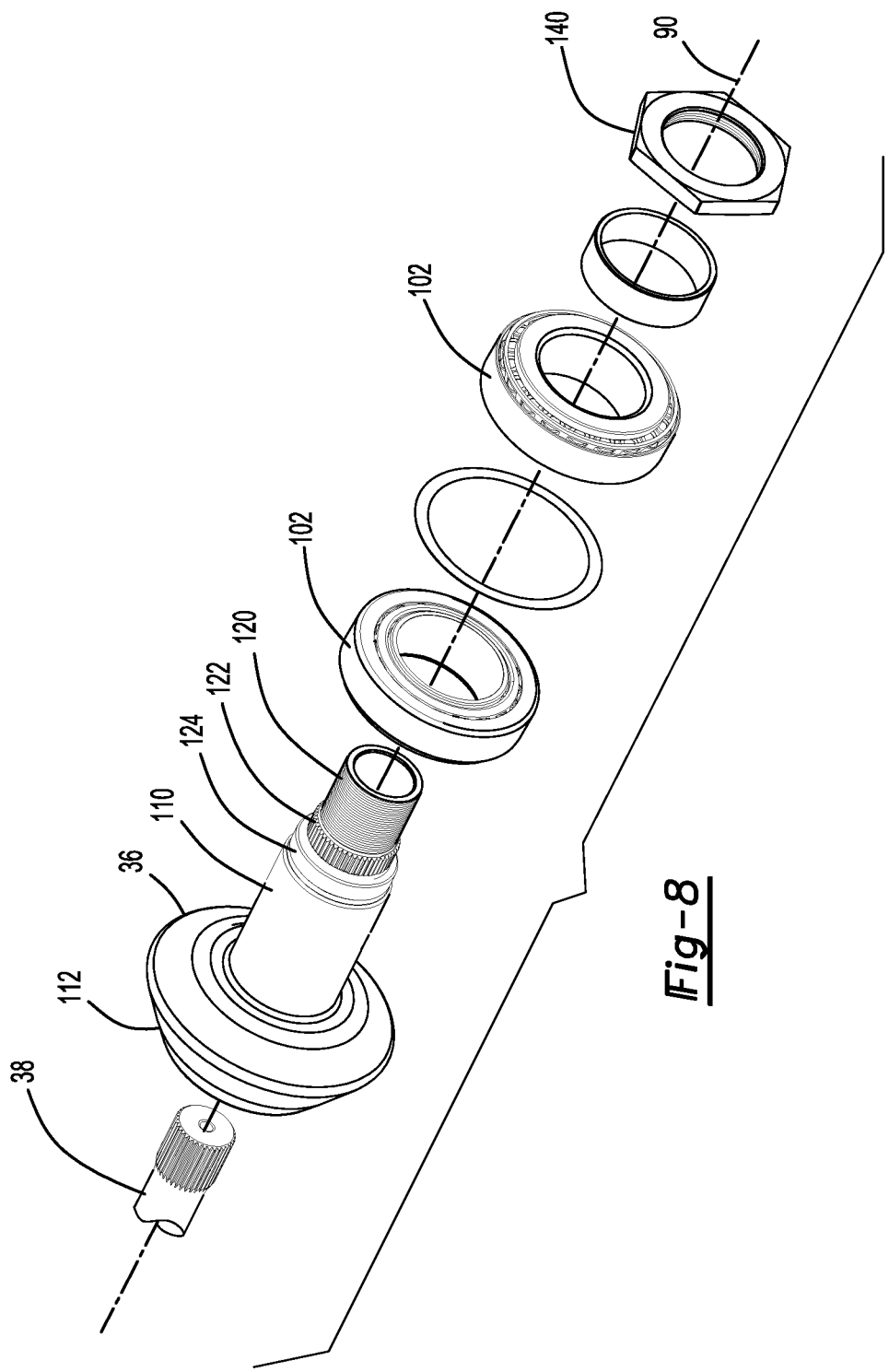
Figure 11:
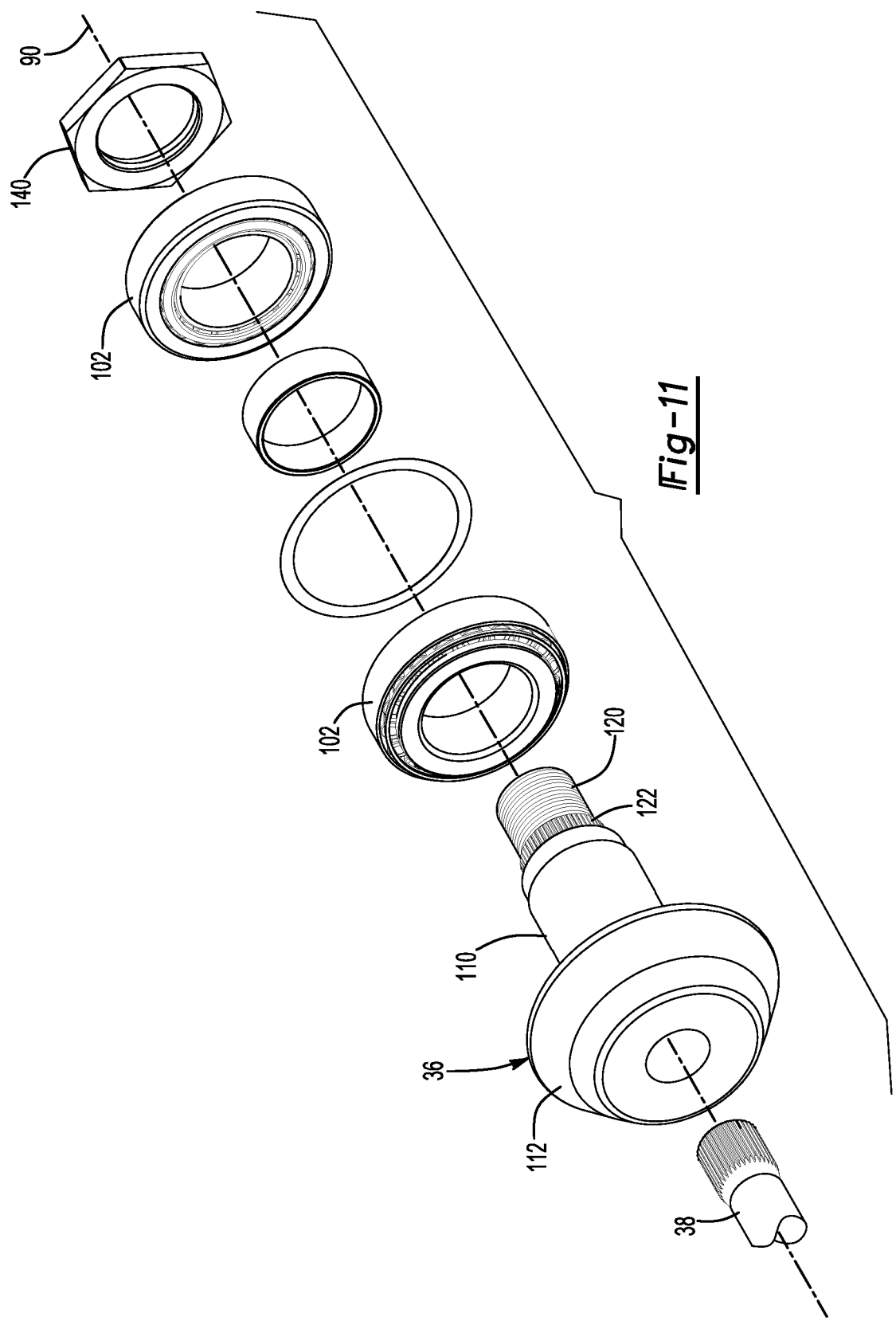

Referring to FIGS. 3, 8 and 11, the drive pinion 36 may provide torque to a ring gear 94 that may be provided with the differential 46. In at least one configuration, the drive pinion 36 may extend along and may be configured to rotate about the first axis 90. The ring gear 94 may be rotatable about a second axis 100. The second axis 100 may be disposed substantially perpendicular to the first axis 90. The drive pinion 36 may be rotatably supported by one or more roller bearing assemblies 102 that may be disposed on the differential carrier 62. In at least one configuration, the drive pinion 36 may include a shaft portion 110 and a gear portion 112.

The shaft portion 110 may extend from the interaxle differential unit 42 to the gear portion 112. The shaft portion 110 may include a passage through which the output shaft 38 may extend. The shaft portion 110 may also include an end portion 120, a drive pinion spline 122, and a threaded portion 124.

Referring primarily to FIG. 8, the end portion 120 may extend from a distal end of the shaft portion 110 that may be disposed opposite the gear portion 112. The end portion 120 may have an exterior circumferential surface that may extend in an axial direction from the distal end of the shaft portion 110 toward or to the drive pinion spline 122. The end portion 120 may support a sun gear of the interaxle differential unit 42 as will be discussed in more detail below and may have a smaller diameter than the drive pinion spline 122.

The drive pinion spline 122 may be axially positioned between the end portion 120 and the threaded portion 124. The drive pinion spline 122 may include a plurality of teeth that may be disposed substantially parallel to the first axis 90 and may mesh or mate with a corresponding spline on a coupling ring 130, which is best shown in FIGS. 3, 7 and 10. For example, the coupling ring 130 may have a coupling ring hole 132 that may receive the shaft portion 110 of the drive pinion 36. In addition, the coupling ring 130 may have inner teeth 134 and outer teeth 136.

The inner teeth 134 may be disposed in the coupling ring hole 132 and may extend toward and may be arranged around the first axis 90. The inner teeth 134 may mesh or mate with the drive pinion spline 122. As such, the coupling ring 130 may rotate with the drive pinion 36.

The outer teeth 136 may be disposed opposite the inner teeth 134. The outer teeth 136 may be disposed opposite the inner teeth 134 and may be arranged around and extend away from the first axis 90. The outer teeth 136 may selectively mesh or mate with a corresponding spline on the shift collar 44 as will be described in more detail below.

The threaded portion 124 may be axially positioned between the drive pinion spline 122 and the gear portion 112. The threaded portion 124 may extend around the first axis 90. The thread or threads of the threaded portion 124 may mate with corresponding threads of an adjuster nut 140, which is best shown in FIGS. 3, 8 and 11, that may exert a preload force on the roller bearing assemblies 102 and may inhibit axial movement of the roller bearing assemblies away from the gear portion 112. The threaded portion 124 may have a larger diameter than the end portion 120 and the drive pinion spline 122.

The gear portion 112 may be disposed at an end of the shaft portion 110. The gear portion 112 may have a plurality of teeth that may mesh or mate with corresponding teeth on the ring gear 94.

Referring to FIG. 3, the output shaft 38 may extend along and may be configured to rotate about the first axis 90. For instance, the output shaft 38 may be supported by one or more roller bearings that may be disposed on the housing assembly 30, such as one or more output bearings 150 that may be disposed near or at an opposite end of the housing assembly 30 from the input bearing 92. The output shaft 38 may extend through the drive pinion 36 and may extend at least partially through the interaxle differential unit 42 as will be discussed in more detail below. The output shaft 38 may be coupled to the interaxle differential unit 42 at a first end. For example, the output shaft 38 may be fixedly coupled to a planetary ring gear of the interaxle differential unit 42. The output shaft 38 may be fixedly coupled to the output yoke 40 at a second end that may be disposed opposite the first end.

Referring to FIGS. 2 and 3, the output yoke 40 may facilitate coupling of the output shaft 38 to the second drive axle assembly 16. For example, the output yoke 40 may be coupled to a connecting shaft, such as the prop shaft 22. The output yoke 40 may be mounted on the output shaft 38. For instance, the output yoke 40 may have an opening that receives the output shaft 38 may be secured to the output shaft 38 with a fastener like a nut 160.

Figure 4:
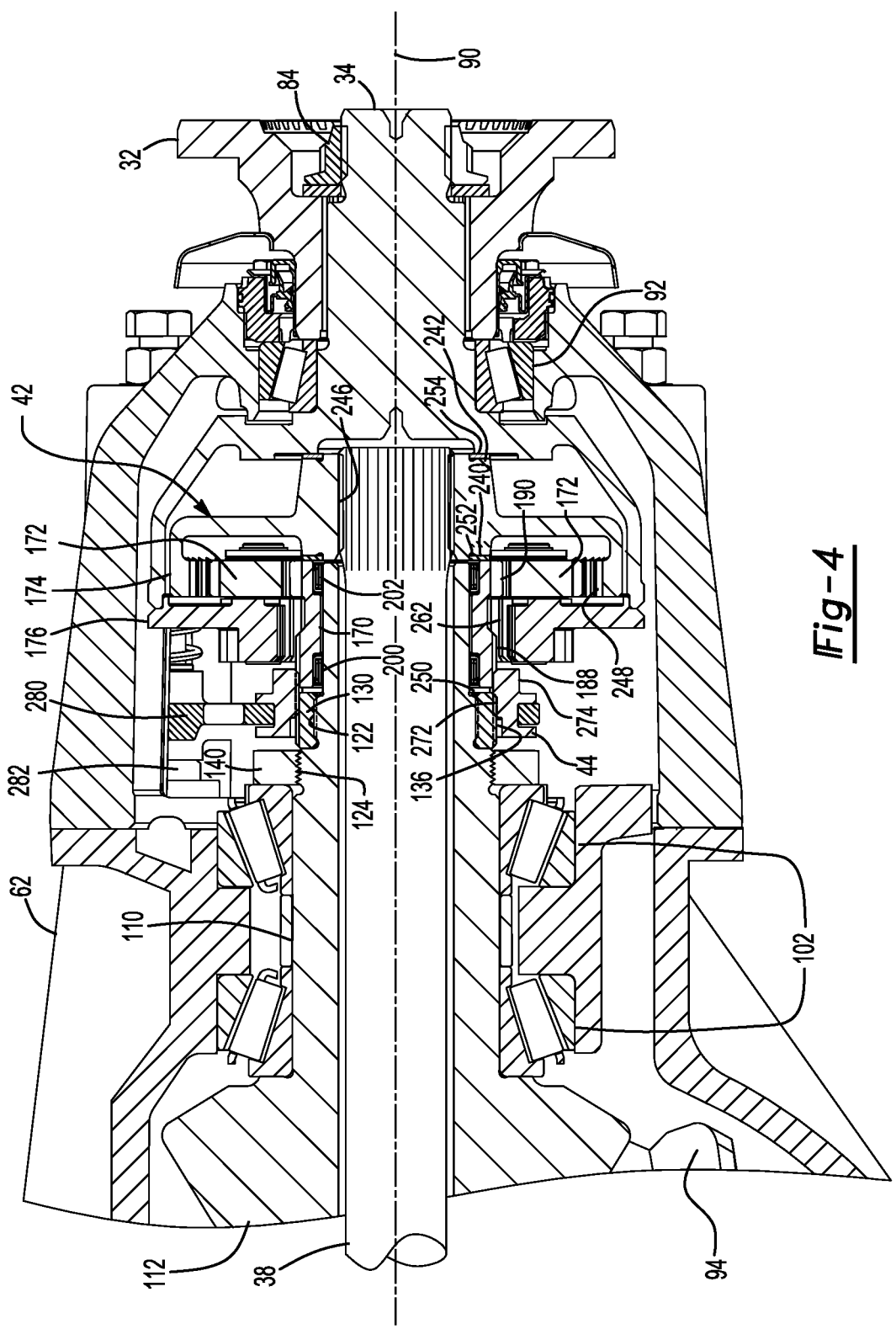
FIG. 4 is a magnified view of a portion of the drive axle assembly shown in FIG. 3 with a shift collar in a first position.

Referring to FIGS. 3 and 4, the interaxle differential unit 42 may operatively connect the input shaft 34 to the drive pinion 36, the output shaft 38, or both. The interaxle differential unit 42 may compensate for speed differences between different drive axle assemblies, such as speed differences between the first drive axle assembly 14 and a second drive axle assembly 16. In at least one configuration, the interaxle differential unit 42 may include a planetary gear set that may include a sun gear 170, at least one planet gear 172, a planetary ring gear 174, and a planet gear carrier 176.

Figure 12:
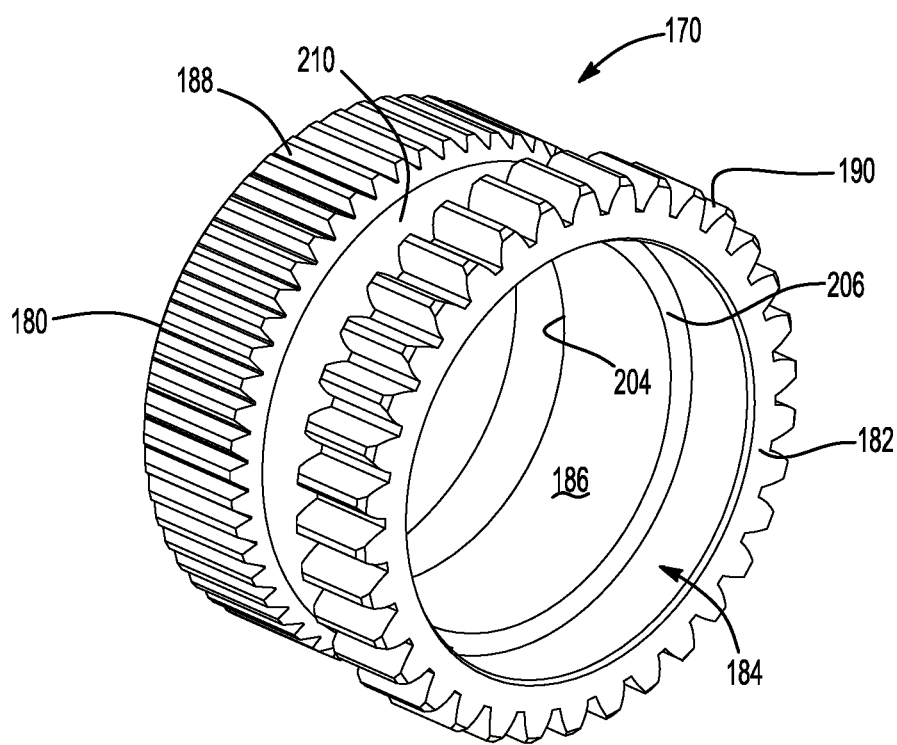
FIG. 12 is a perspective view of a sun gear that may be provided with an interaxle differential unit.

Referring to FIGS. 4 and 12, the sun gear 170 may be disposed proximate the center of the planetary gear set and may be rotatable about the first axis 90. In addition, the sun gear 170 may extend through the planet gear carrier 176 and partially through the planetary ring gear 174. As is best shown primarily with reference to FIG. 12, the sun gear 170 may be configured as a hollow tubular body that may include a first end surface 180, a second end surface 182, a sun gear hole 184, a spacer portion 186, a first set of sun gear teeth 188, and a second set of sun gear teeth 190.

The first end surface 180 may be disposed at an end of the sun gear 170 that may face toward the drive pinion 36. The first end surface 180 may be disposed outside the planetary ring gear 174 and the planet gear carrier 176.

The second end surface 182 may be disposed at an end of the sun gear 170 that may face toward the input shaft 34 and the planetary ring gear 174. As such, the second end surface 182 may be disposed opposite the first end surface 180. The second end surface 182 may be disposed inside the planetary ring gear 174.

The sun gear hole 184 may extend from the first end surface 180 to the second end surface 182. The sun gear hole 184 may extend along and may be centered about the first axis 90. The drive pinion 36 may extend into or through the sun gear hole 184 and may be spaced apart from the sun gear 170. In addition, the output shaft 38 may extend through the sun gear hole 184.

As is best shown with reference to FIGS. 4, 7 and 10, the sun gear hole 184 may receive a first sun gear bearing 200 and a second sun gear bearing 202. The first and second sun gear bearings 200, 202 may be configured as roller bearing assemblies that may extend around and may be disposed on the end portion 120 of the drive pinion 36, which is best shown in FIG. 8. The first and second sun gear bearings 200, 202 may extend from the drive pinion 36 to the sun gear 170 and may rotatably support the sun gear 170 on the drive pinion 36.

Referring to FIG. 12, the spacer portion 186 may be disposed in the sun gear hole 184. The spacer portion 186 may be axially positioned between the first end surface 180 and the second end surface 182 and may protrude radially toward the first axis 90. The spacer portion 186 may have a smaller inside diameter than adjacent portions of the sun gear hole 184 and may separate and help position the first and second sun gear bearings 200, 202 in the sun gear hole 184. The spacer portion 186 may define a first step surface 204 and a second step surface 206.

The first step surface 204 may face toward the first end surface 180 and may be spaced apart from the first end surface 180. In at least one configuration, the first step surface 204 may be disposed substantially perpendicular to the first axis 90. The first step surface 204 may engage the first sun gear bearing 200 and may inhibit axial movement of the first sun gear bearing 200 toward the second end surface 182, or to the right from the perspective shown in FIG. 4.

The second step surface 206 may be disposed opposite the first step surface 204. The second step surface 206 may face toward the second end surface 182 and may be spaced apart from the second end surface 182. In at least one configuration, the second step surface 206 may be disposed substantially perpendicular to the first axis 90. The second step surface 206 may engage the second sun gear bearing 202 and may inhibit axial movement of the second sun gear bearing 202 toward the first end surface 180, or to the left from the perspective shown in FIG. 4.

The first set of sun gear teeth 188 may be disposed opposite the sun gear hole 184 and may be arranged around the sun gear hole 184 in a repeating arrangement. For example, the sun gear teeth 188 may extend radially away from the first axis 90 and may extend axially in a direction that is substantially parallel to the first axis 90. The first set of sun gear teeth 188 may be disposed closer to the first end surface 180 than the second set of sun gear teeth 190. As one example, the first set of sun gear teeth 188 may extend axially from the first end surface 180 toward the second set of sun gear teeth 190. As is best shown in FIG. 4, the first set of sun gear teeth 188 may be disposed opposite the first sun gear bearing 200.

The second set of sun gear teeth 190 may be disposed opposite the sun gear hole 184 and may be arranged around the sun gear hole 184 in a repeating arrangement. For example, the sun gear teeth 190 may extend radially away from the first axis 90 and may extend axially in a direction that is substantially parallel to the first axis 90. The second set of sun gear teeth 190 may be disposed closer to the second end surface 182 than the first set of sun gear teeth 188. As an example, the second set of sun gear teeth 190 may extend axially from the second end surface 182 toward the first set of sun gear teeth 188. In at least one configuration, the second set of sun gear teeth 190 may have a larger outside diameter than the first set of sun gear teeth 188. As is best shown in FIG. 4, the second set of sun gear teeth 190 may be disposed opposite the second sun gear bearing 202.

The second set of sun gear teeth 190 may be spaced apart from the first set of sun gear teeth 188. For instance, a connecting region 210, which is best shown in FIG. 12, may be disposed between the first set of sun gear teeth 188 and the second set of sun gear teeth 190 that may have a smaller diameter than the first set of sun gear teeth 188 and the second set of sun gear teeth 190.

Referring to FIGS. 4, 7 and 10, alt least one planet gear 172 may be rotatably disposed between the sun gear 170 and the planetary ring gear 174. In the configuration shown, eight planet gears 172 are depicted; however, it is contemplated that a greater or lesser number of planet gears 172 may be provided. The planet gears 172 may be spaced apart from each other and each planet gear 172 may be rotatable about a different planet gear axis 220. The planet gear axes 220 may be disposed substantially parallel to the first axis 90. Each planet gear 172 may have a hole and a set of teeth. The hole may be a through hole that may extend through the planet gear 172. The hole may receive a pin 222 about which the planet gear 172 may rotate. The pin 222 may be fixedly mounted to the planet gear carrier 176. Optionally, a bearing may also be received in the hole and may rotatably support the planet gear 172 on a corresponding pin 222. The set of teeth may be disposed opposite the hole. The set of teeth may mesh with the second set of sun gear teeth 190 and teeth on the planetary ring gear 174.

The planetary ring gear 174 may extend around the first axis 90 and may receive the planet gears 172. In addition, the planetary ring gear 174 may be rotatable with respect to the drive pinion 36. In at least one configuration, the planetary ring gear 174 may include a mounting hub 230, a first flange 232, and a second flange 234.

The mounting hub 230 may facilitate mounting of the planetary ring gear 174 to the output shaft 38. The mounting hub 230 may be axially positioned between the drive pinion 36 and the input shaft 34 and may define a hole that may receive the output shaft 38. In at least one configuration, the mounting hub 230 may have a first end 240, a second end 242, a mounting hub hole 244, and a mounting hub spline 246. These features are best shown with reference to FIGS. 4, 7 and 10.

The first end 240 may face toward the sun gear 170. The first end 240 may be disposed substantially perpendicular to the first axis 90 in one or more embodiments.

The second end 242 may be disposed opposite the first end 240 and may face toward the input shaft 34. The second end 242 may be disposed substantially perpendicular to the first axis 90 in one or more embodiments.

First, second, and third thrust bearings 250, 252, 254 may be provided to help axially position and inhibit axial movement of the sun gear 170 and the planetary ring gear 174. For example, the first thrust bearing 250 may extend from an end of the coupling ring 130 to the first end surface 180 of the sun gear 170. The second thrust bearing 252 may extend from second end surface 182 of the sun gear 170 to the first end 240 of the mounting hub 230. The third thrust bearing 254 may extend from the second end 242 of the mounting hub 230 to a side or surface of the input shaft 34 that faces toward the output shaft 38. The first thrust bearing 250 may be received in the shift collar hole 270. The second and third thrust bearings 252, 254 may be disposed outside of the mounting hub hole 244.

The mounting hub hole 244 may extend from the first end 240 to the second end 242. The mounting hub hole 244 may extend along and may be centered about the first axis 90.

The mounting hub spline 246 may be disposed in the mounting hub hole 244 and may facilitate mounting of the planetary ring gear 174 to the output shaft 38. For example, the mounting hub spline 246 may mesh or mate with a corresponding spline or set of splines on the output shaft 38 such that the planetary ring gear 174 and the output shaft 38 rotate together about the first axis 90.

Referring to FIGS. 7 and 10, the first flange 232 may extend radially outward from the mounting hub 230 to the second flange 234.

The second flange 234 may extend from an end of the first flange 232. For instance, the second flange 234 may extend toward and may be spaced apart from the planet gear carrier 176. A plurality of teeth 248 may be provided on the second flange 234 that may extend toward the first axis 90 and may mesh with teeth on the planet gears 172.

Referring to FIGS. 4, 7 and 10, the planet gear carrier 176 may be rotatable about the first axis 90. For example, the planet gear carrier 176 may be fixedly coupled to the cup portion of the input shaft 34. As such, the input shaft 34 and the planet gear carrier 176 may rotate together about the first axis 90. The planet gear carrier 176 may support the pins 222. For example, the pins 222 may extend from a side of the planet gear carrier 176 that faces toward the first flange 232 of the planetary ring gear 174. In at least one configuration, the planet gear carrier 176 may include a planet carrier hole 260 and a set of planet carrier teeth 262.

The planet carrier hole 260 may extend around the first axis 90 and may receive the sun gear 170 such that the planet gear carrier 176 is spaced apart from the sun gear 170.

The set of planet carrier teeth 262 may be disposed in the planet carrier hole 260 and may extend toward the first axis 90. The planet carrier teeth 262 may be arranged in a repeating arrangement around the first axis 90 and may extend axially in a direction that is substantially parallel to the first axis 90. The shift collar 44 may selectively mesh or mate with the set of planet carrier teeth 262 as will be discussed in more detail below. The set of planet carrier teeth 262 may be disposed closer to the first axis 90 than the planet gear axes 220.

Referring to FIGS. 4, 7 and 10, The shift collar 44 may be movable in an axial direction or in a direction that extends along the first axis 90 between a first position and a second position as will be discussed in more detail below. The shift collar 44 may be generally ring-shaped and may include a shift collar hole 270, a set of internal teeth 272, a set of external teeth 274, and a shift collar groove 276.

The shift collar hole 270 may be a through hole that may extend through the shift collar 44 and extend around the first axis 90. The shift collar hole 270 may receive the coupling ring 130 and may selectively receive the sun gear 170.

The set of internal teeth 272 may be disposed in the shift collar hole 270. The internal teeth 272 may extend toward the first axis 90 and may mesh or mate with the outer teeth 136 of the coupling ring 130. As such, the mating teeth may allow the shift collar 44 to move in an axial direction or along the first axis 90 while inhibiting rotation of the shift collar 44 about the first axis 90 with respect to the coupling ring 130.

The set of external teeth 274 may be disposed opposite the shift collar hole 270 and the set of internal teeth 272. The external teeth 274 may extend away from the first axis 90 and may selectively mesh or mate with the set of planet carrier teeth 262.

The shift collar groove 276 may face away from the first axis 90 and may extend around the first axis 90. The shift collar groove 276 may receive a linkage, such as a shift fork 280, that may operatively connect the shift collar 44 to an actuator 282.

Referring to FIG. 4, the actuator 282 may move the shift collar 44 between a first position and a second position. The actuator 282 may be of any suitable type, such as a pneumatic, hydraulic, electrical, mechanical, or electromechanical actuator.

The shift collar 44 is shown in the first position in FIG. 4. The set of internal teeth 272 of the shift collar 44 may mesh or mate with the outer teeth 136 of the coupling ring 130 and with the first set of sun gear teeth 188, and the set of external teeth 274 may be spaced apart from and may not mesh or mate with the planet carrier teeth 262 when the shift collar 44 is in the first position. As such, the sun gear 170 and the drive pinion 36 may rotate together about the first axis 90. Torque may be transmitted to the first drive axle assembly 14 and the second drive axle assembly 16 when the shift collar 44 is in the first position. For example, torque may be transmitted from the interaxle differential unit 42 to the drive pinion 36 via the sun gear 170, shift collar 44, and coupling ring 130 while torque may be transmitted from the interaxle differential unit 42 to the output shaft 38 via the planetary ring gear 174 and planet gears 172. Moreover, the planetary gear set of the interaxle differential unit 42 may allow the drive pinion 36 and the output shaft 38 to rotate at different speeds about the first axis 90.

The shift collar 44 is shown in the second position in FIG. 5. The set of internal teeth 272 of the shift collar 44 may mesh or mate with the first set of sun gear teeth 188 but may not mesh or mate with the outer teeth 136 of the coupling ring 130, and the set of external teeth 274 may mesh or mate with the planet carrier teeth 262 when the shift collar 44 is in the second position. As such, the sun gear 170 may rotate with the planet gear carrier 176 about the first axis 90 and may be free to rotate about the first axis 90 independently of the drive pinion 36. Accordingly, torque may not be transmitted between the sun gear 170 and the drive pinion 36. As an example, input torque that is provided to the input shaft 34 may cause the sun gear 170 to rotate about the first axis 90 with respect to the drive pinion 36 and torque may not be transmitted from the drive pinion 36 to the differential 46 and its associated axle shafts 48 and wheel assemblies 20. Torque may be transmitted between the input shaft 34 and the output shaft 38 via the interaxle differential unit 42 when the shift collar 44 is in the second position. As an example, input torque that is provided to the input shaft 34 may be transmitted to the output shaft 38 via the planet gear carrier 176, planet gears 172, and the planetary ring gear 174.

Referring to FIGS. 1 and 2, the differential 46 of the first drive axle assembly 14, which may be referred to as a first differential, may be disposed in the center portion 70 of the housing assembly 30. The differential 46 may transmit torque to the wheel assemblies 20 and permit the wheel assemblies 20 of the first drive axle assembly 14 to rotate at different velocities. An abbreviated discussion of the operation of the differential 46 follows.

Torque that is provided to the drive pinion 36 may be transmitted to the ring gear 94 of the differential 46. The differential 46 may be operatively connected to the axle shafts 48 and may permit the axle shaft 48 to rotate at different rotational speeds in a manner known by those skilled in the art. As such, the differential 46 may receive torque via the ring gear 94 and provide torque to the axle shafts 48 and to the associated wheel assemblies 20, provided that any associated wheel end disconnects are connected or permit torque to be transmitted between the differential 46 and the wheel assemblies 20.

The second drive axle assembly 16 may also have a differential 46, which may be referred to as a second differential, that may be disposed in the center portion 70 of its housing assembly. The differential 46 may transmit torque to the wheel assemblies 20 and permit the wheel assemblies 20 of the second drive axle assembly 16 to rotate at different velocities.

Referring to FIGS. 1 and 2, the axle shafts 48 may be configured to transmit torque from an associated differential 46 to corresponding wheel assemblies 20. For example, two axle shafts 48 may be provided such that each axle shaft 48 extends through a different arm portion 72 of axle housing 60. The axle shafts 48 may extend along and may be rotatable about the second axis 100 by the differential 46. Optionally, each axle shaft 48 may be operatively connected to a wheel end assembly 50 via a wheel end disconnect.

Figure 16:
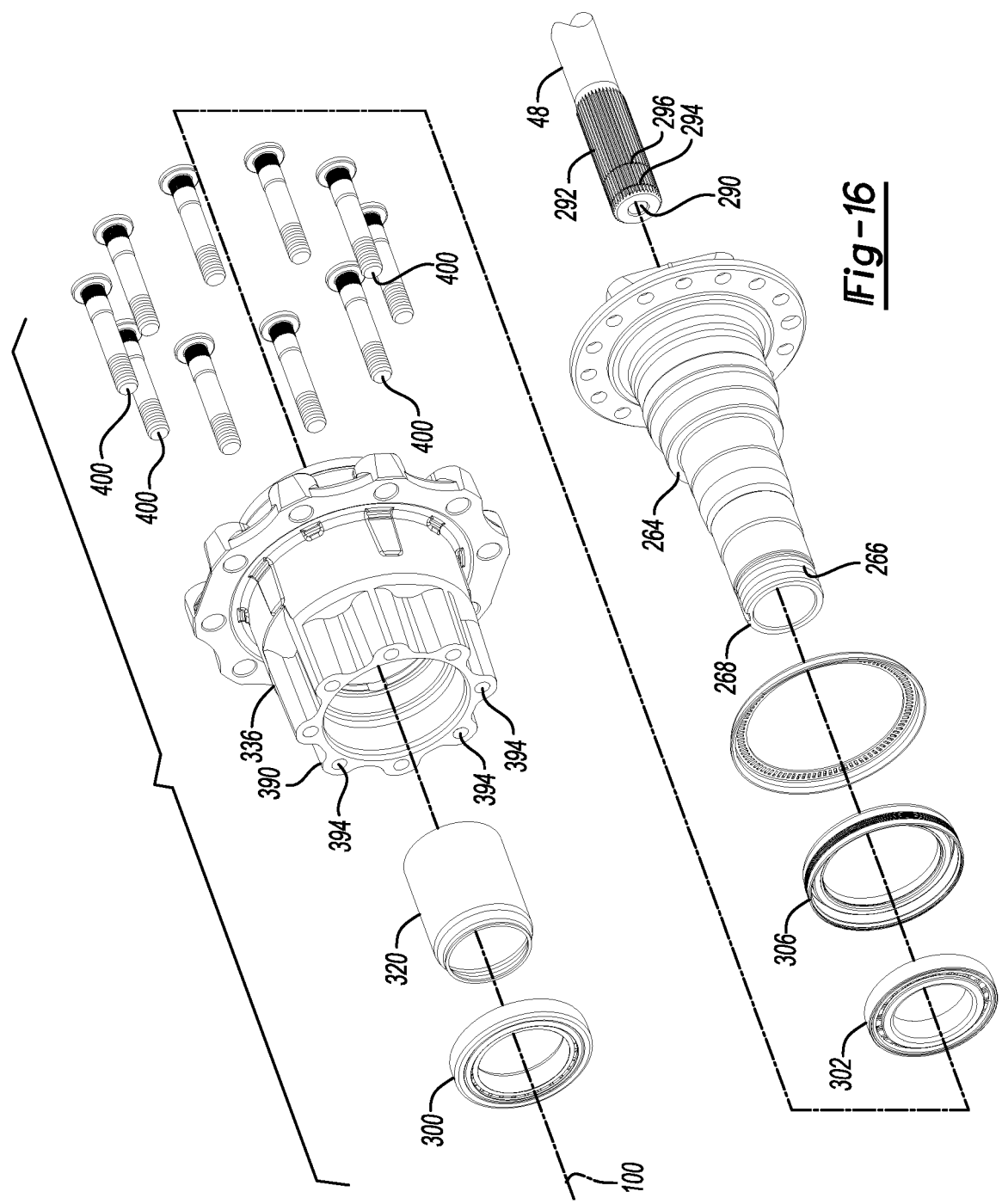

Each axle shaft 48 may have a first end and a second end. The first end may be operatively connected to the differential 46. The second end may be disposed opposite the first end and may be operatively connected to a corresponding wheel end assembly 50. In at least one configuration, the second end may include an axle recess 290 an axle spline 292, a first groove 294, and a second groove 296 as is best shown in FIG. 16.

The axle recess 290 may be disposed along the second axis 100. The axle recess 290 may be configured as a blind hole that may extend from an end surface of the axle shaft 48 toward the first end and the differential 46.

The axle spline 292 may be disposed opposite the axle recess 290. The axle spline 292 may include a plurality of teeth that may be arranged around an exterior surface or outside circumference of the axle shaft 48. The teeth may be disposed substantially parallel to the second axis 100.

The first groove 294 and the second groove 296 may be provided in the axle spline 292. For example, the first groove 294 and the second groove 296 may each have an annular configuration in which the first groove 294 and the second groove 296 may extend continuously around the second axis 100. In addition, the first groove 294 and the second groove 296 may extend in a radial direction toward the second axis 100 such that the first groove 294 and the second groove 296 may extend at least partially through the teeth of the axle spline 292. The first groove 294 may be disposed substantially parallel to the second groove 296 and may be spaced apart from the second groove 296. For example, the first groove 294 may be axially positioned closer to the end surface of the axle shaft 48 than the second groove 296. In at least one configuration, the first groove 294 may extend around the axle recess 290 while the second groove 296 may not extend around the axle recess 290.

Figure 13:
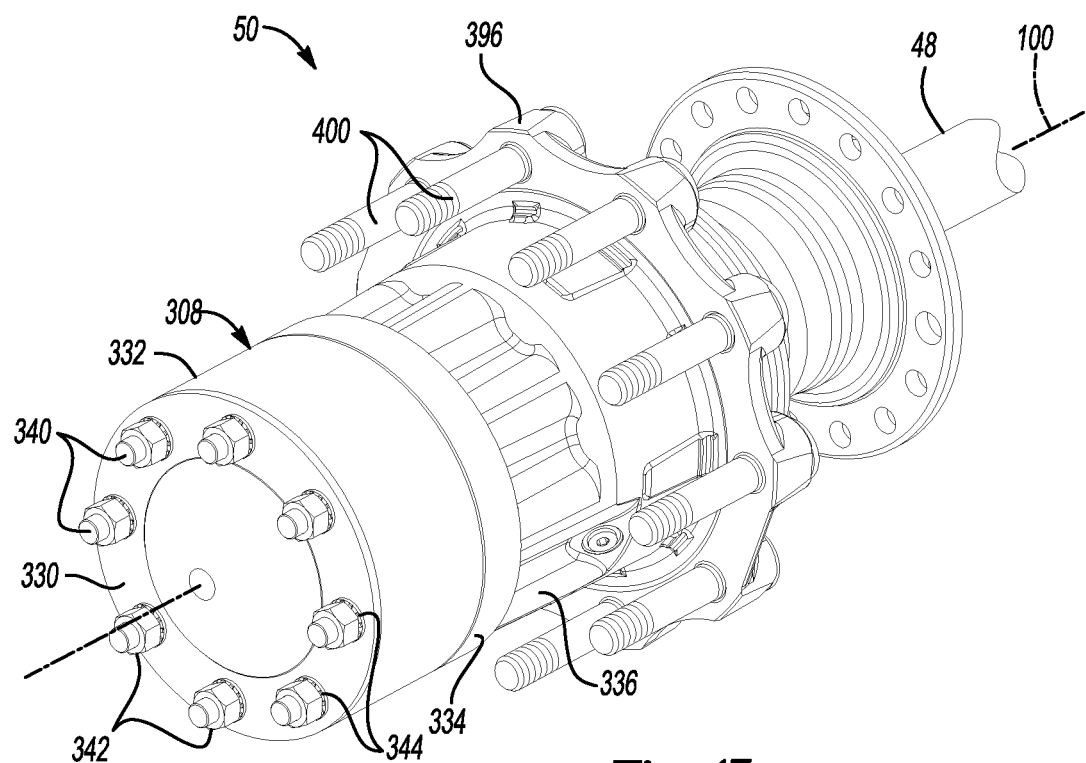
FIG. 13 is a perspective view of a portion of FIG. 2 having a wheel end disconnect.
Figure 20:
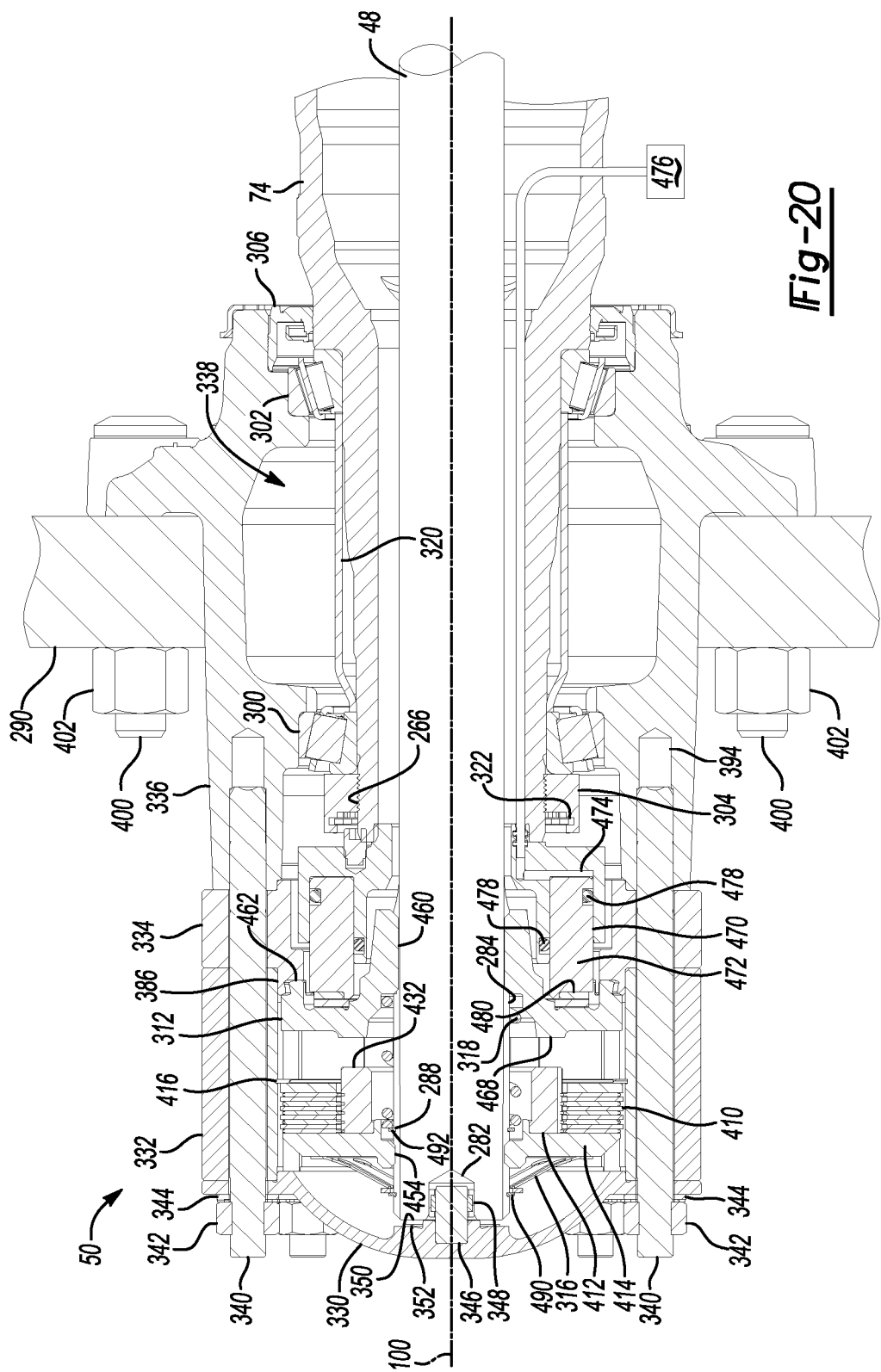
FIG. 20 is a section view along section line 20-20 showing a locking clutch in a locked position and a friction clutch in an engaged position.

Referring to FIGS. 2 and 13, wheel end assemblies 50 may be provided with at least one axle assembly. For example, a wheel end assembly 50 may be mounted at opposing ends of the housing assembly 30. The wheel end assembly 50 may facilitate mounting and rotation of a wheel assembly 20, such as is depicted in FIG. 20. In addition, the wheel end assembly 50 may be selectively connectable to and disconnectable from a corresponding axle shaft 48 via a wheel end disconnect.

A pair of wheel end disconnects may be provided with at least one drive axle assembly. For example, a wheel end disconnect may be associated with each axle shaft 48. The wheel end disconnect may selectively connect the differential 46 to a corresponding hub assembly 308 that may be rotatable about the second axis 100 and that may support and facilitate mounting of a wheel assembly 20. The wheel end disconnect may be provided in various locations. For instance, the wheel end disconnect may be provided with the differential 46 or located adjacent to the differential 46 and an end of a corresponding axle shaft 48. As another option, the wheel end disconnect may be disposed at an intermediate location that may be disposed between the differential 46 and the hub assembly 308 and may be spaced apart from the differential 46 and the hub assembly 308, such as is disclosed in U.S. Pat. No. 8,651,994, the disclosure of which is hereby incorporated by reference in its entirety. As another option, the wheel end disconnect may be disposed adjacent to the hub assembly 308 or inside the hub assembly 308, as is disclosed in U.S. Pat. No. 10,513,146, the disclosure of which is hereby incorporated by reference in its entirety.

Figure 14:
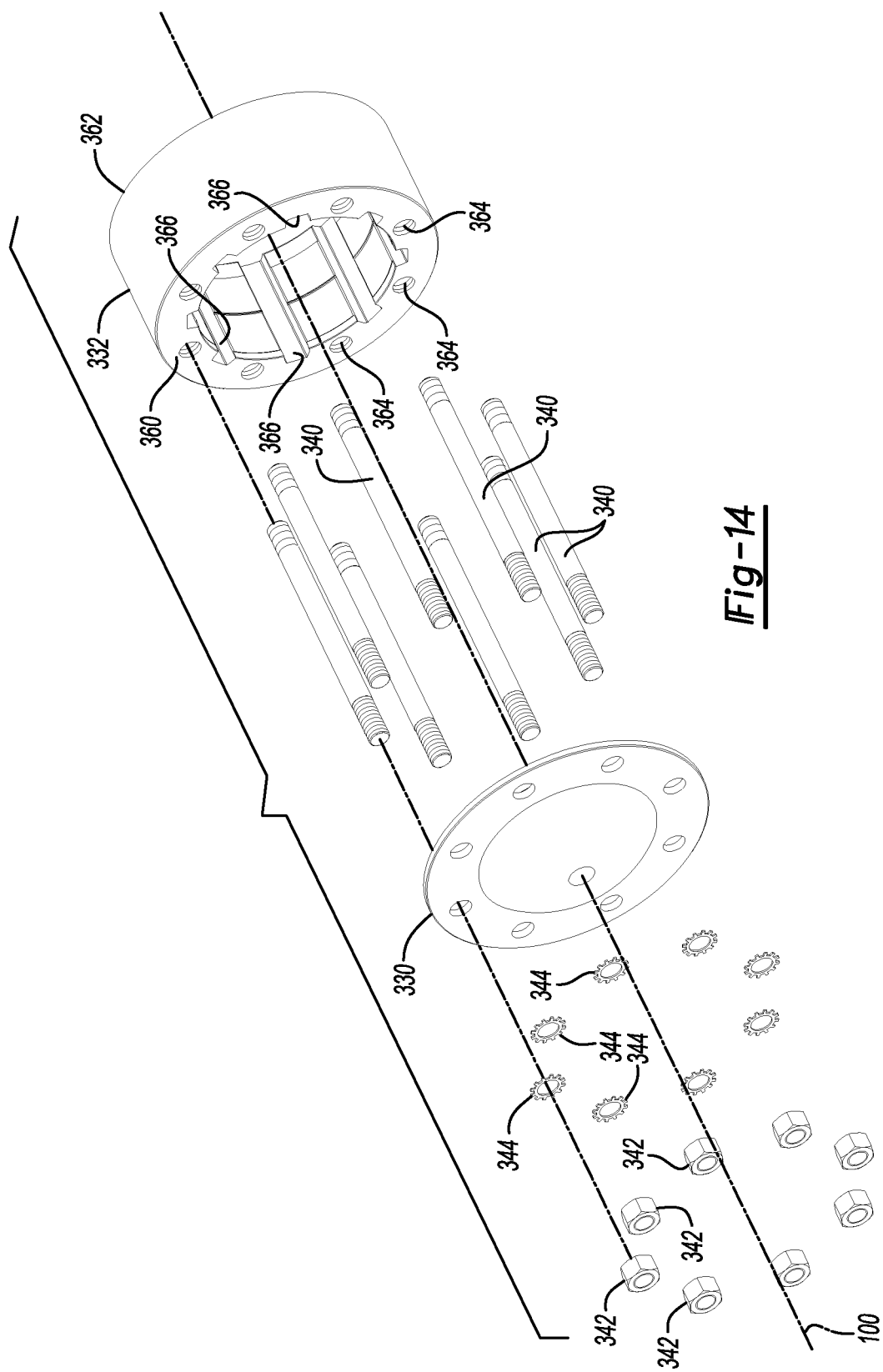
FIGS. 14-16 comprise an exploded view of FIG. 13.
Figure 15:
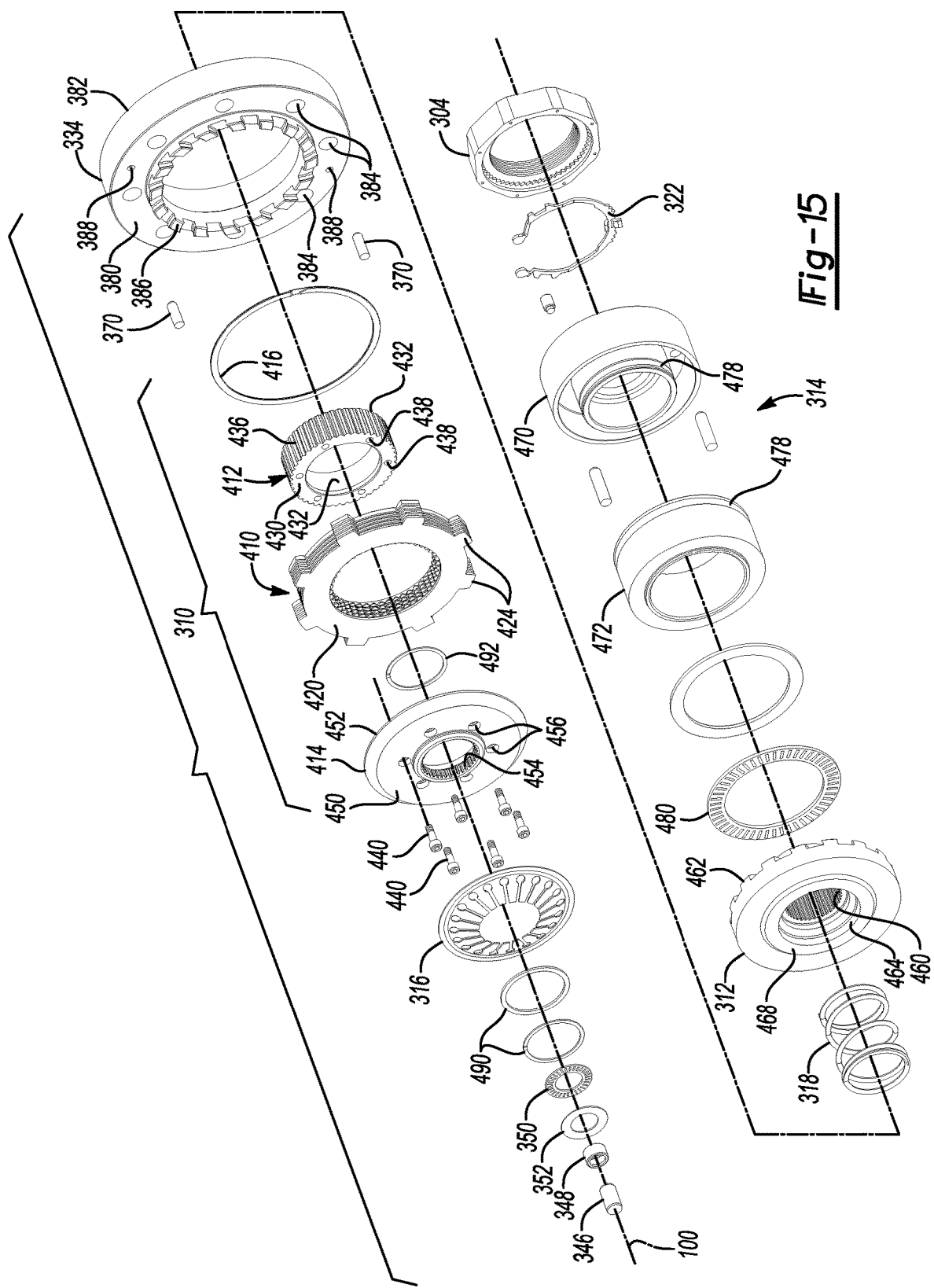

In at least one configuration such as is shown in FIGS. 14-16, the wheel end assembly 50 may include a first wheel bearing 300, a second wheel bearing 302, a preload nut 304, a seal assembly 306, a hub assembly 308, a friction clutch 310, a locking clutch 312, a locking clutch actuator 314, a first biasing member 316, and a second biasing member 318.

The components associated with selectively connecting and disconnecting the wheel end assembly 50 from a corresponding axle shaft 48 may be referred to as a wheel end disconnect. For instance, components such as the friction clutch 310, locking clutch 312, locking clutch actuator 314, first biasing member 316, and second biasing member 318 may allow torque to be transmitted between the axle shaft 48 and its corresponding hub assembly 308 that is sufficient to rotate the hub assembly 308 when the wheel end disconnect is connected or in a connected condition and may not allow torque to be transmitted between the axle shaft 48 and its corresponding hub assembly 308 that is sufficient to rotate the hub assembly 308 when disconnected or in a disconnected condition.

Figure 19:
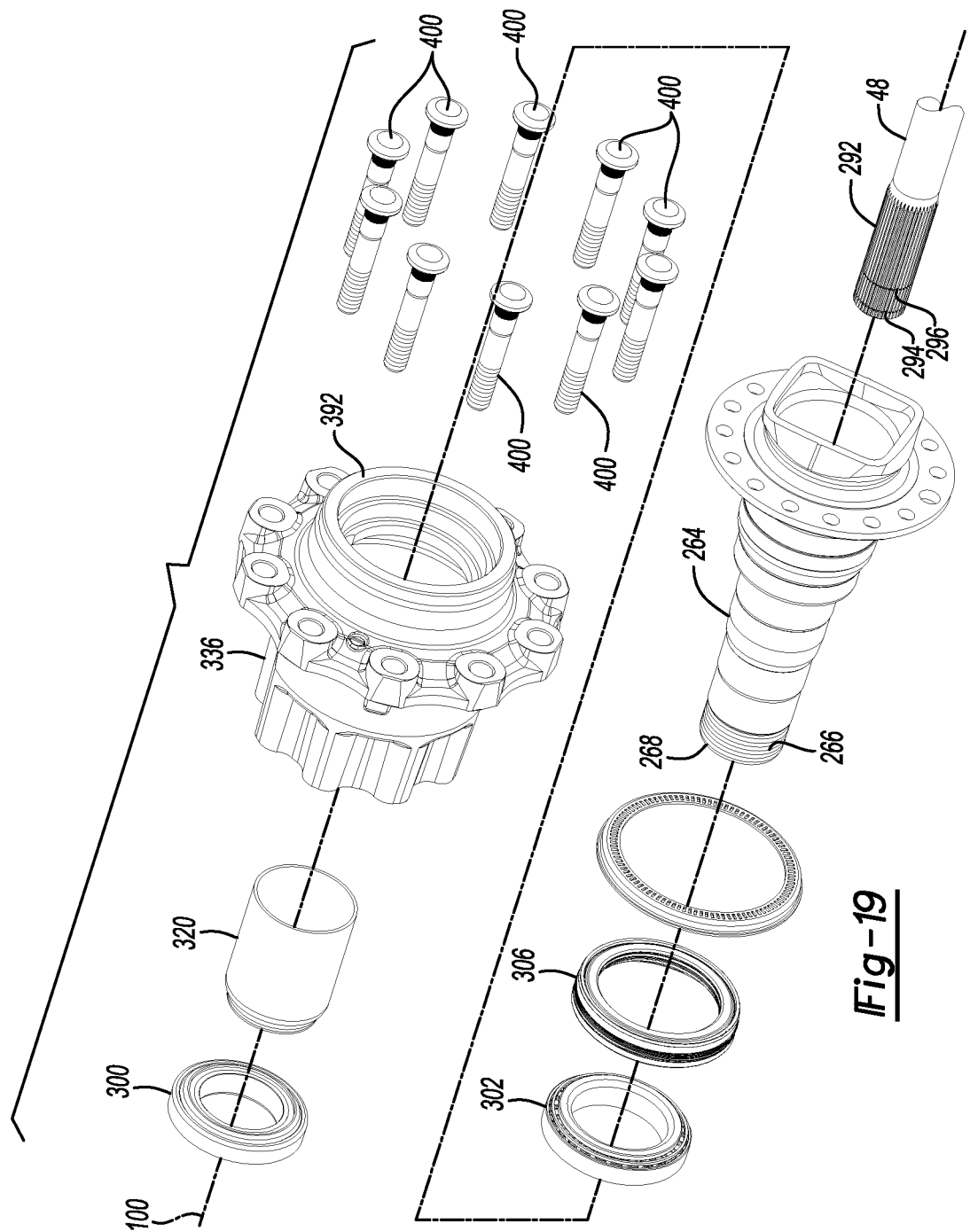

Referring to FIGS. 16, 19 and 20, the first wheel bearing 300 may be disposed on the spindle 74 and may rotatably support the hub assembly 308. For example, the first wheel bearing 300 may be disposed on and may extend around the external surface of the spindle 74 and may be received inside the hub assembly 308. The first wheel bearing 300 may be positioned closer to the spindle end surface 78 than the second wheel bearing 302. The first wheel bearing 300 may have any suitable configuration. For instance, the first wheel bearing 300 may include a plurality of rolling elements, such as balls or rollers, that may be disposed between an inner race and an outer race. The inner race may be disposed on and may extend around an external surface or outside circumferential surface of the spindle 74. The outer race may be disposed on the hub assembly 308 and may extend around the inner race.

The second wheel bearing 302 may also be disposed on the spindle 74 and may rotatably support the hub assembly 308. For example, the second wheel bearing 302 may be disposed on and may extend around the external surface of the spindle 74 and may be received inside the hub assembly 308. The second wheel bearing 302 may be spaced apart from the first wheel bearing 300 and may be positioned closer to the differential 46 than the first wheel bearing 300. The second wheel bearing 302 may have any suitable configuration. For instance, the second wheel bearing 302 may include a plurality of rolling elements, such as balls or rollers, that may be disposed between an inner race and an outer race.

Figure 18:
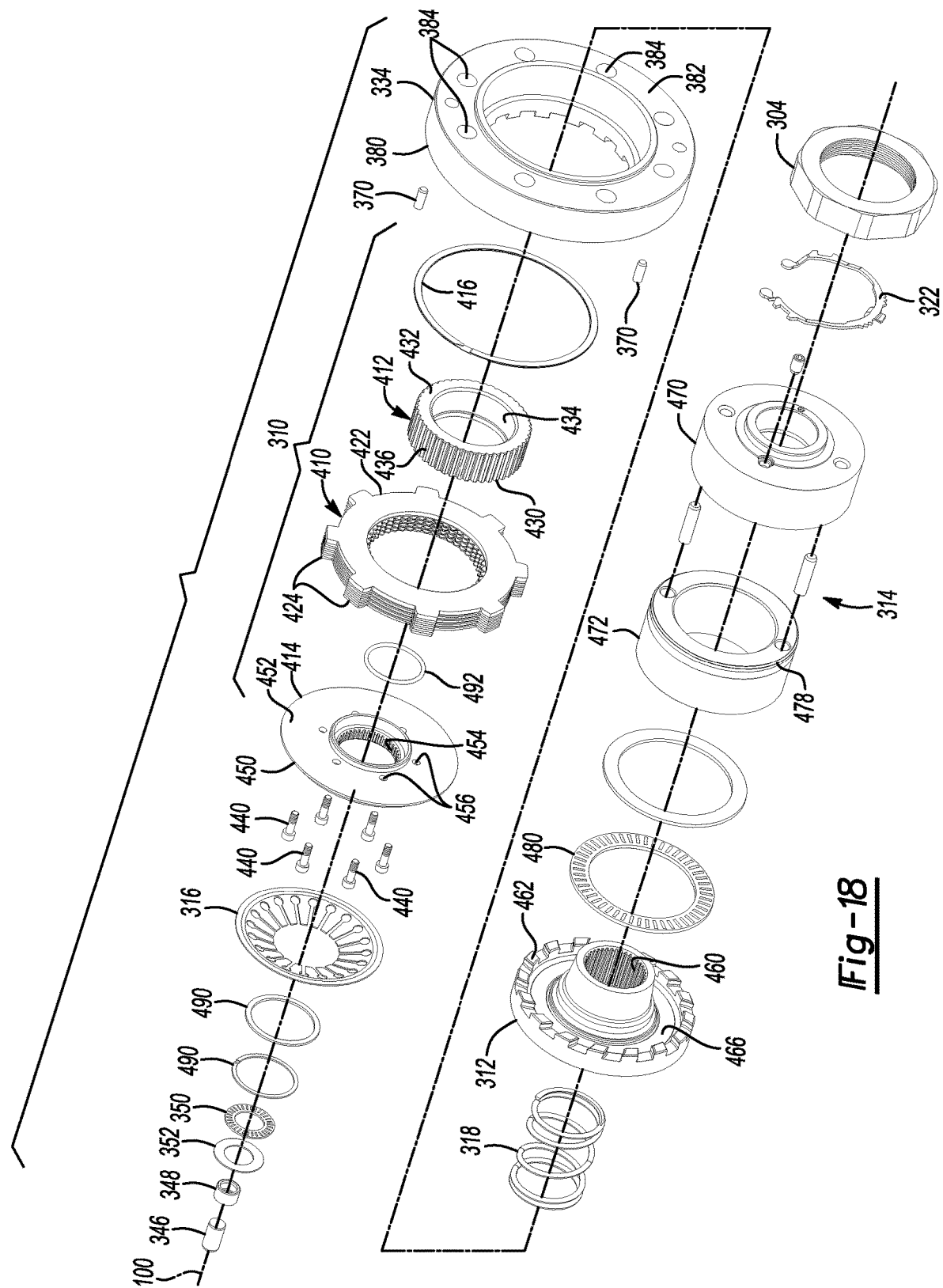

Referring to FIGS. 15, 18 and 20, the preload nut 304 may help secure the first wheel bearing 300. More specifically, the preload nut 304 may inhibit or limit axial movement of the first wheel bearing 300 along the spindle 74 in a direction that extends toward the spindle end surface 78. For example, the preload nut 304 may receive and may mate with corresponding threads of the threaded portion 76 of the spindle 74. The preload nut 304 may engage the inner race of the first wheel bearing 300 and may be tightened to exert a preload force on the first wheel bearing 300 or the first wheel bearing 300 and the second wheel bearing 302. For instance, a spacer 320, which is shown in FIGS. 5, 8 and 9, may extend from the inner race of the first wheel bearing 300 to the inner race of the second wheel bearing 302. As such, the spacer 320 may keep the inner races at a substantially constant axial distance from each other and facilitate the transmission of preload force. The preload nut 304 may be secured with one or more fasteners 322, such as a snap ring, screw, bolt or combinations thereof, to inhibit the preload nut 304 from rotating or loosening. A key may be provided on the fastener 322 that may be received in a corresponding key slot in the spindle 74 to inhibit rotation of the fastener 322.

Referring to FIGS. 16, 19 and 20, the seal assembly 306 may be disposed between the hub assembly 308 and the spindle 74. For example, the seal assembly 306 may extend continuously around the second axis 100 and the spindle 74 and may extend from the spindle 74 to the hub assembly 308. The seal assembly 306 may help inhibit lubricant from exiting the hub assembly 308 and may inhibit contaminants from entering the hub assembly 308.

Referring to FIGS. 13 and 20, the hub assembly 308, which may also be referred to as a wheel hub, may be rotatably disposed on the spindle 74. As such, the hub assembly 308 may be rotatable about the second axis 100 with respect to the spindle 74. In at least one configuration, the hub assembly 308 may include a hub cap 330, a first hub portion 332, a second hub portion 334, a third hub portion 336, and a hub cavity 338.

Referring to FIGS. 13, 14, 17 and 20, the hub cap 330 may be disposed at distal end of the hub assembly 308. The hub cap 330 may enclose an end of the hub assembly 308 that may be located near the distal end of the axle shaft 48. The hub cap 330 may be fastened to the first hub portion 332 in any suitable manner, such as with one or more fasteners, such as bolts or mounting studs. In at least one configuration, a set of mounting studs 340 are arranged around the second axis 100 and extend through corresponding openings in the hub cap 330. The hub cap 330 may be further secured with nuts 342 and washers 344 that may receive the mounting studs 340.

Referring to FIGS. 15, 18 and 20, the hub cap 330 may be integrally formed with or may receive a guide pin 346. The guide pin 346 may extend along the second axis 100 toward the axle shaft 48 and may be received in the axle recess 290 to rotatably support the axle shaft 48. A support bearing 348, such as a roller bearing, may be disposed in the axle recess 290 and may extend around the guide pin 346 to help align and rotatably support the axle shaft 48. A thrust bearing 350 and optionally a washer 352 may be provided between the hub cap 330 and the end of the axle shaft 48 to facilitate rotation of the axle shaft 48 with respect to the hub cap 330.

Referring to FIGS. 13, 14, 17 and 20, the first hub portion 332 may receive the friction clutch 310. In at least one configuration, the first hub portion 332 may extend around the friction clutch 310 and may extend in an axial direction that may extend along the second axis 100 from the hub cap 330 to the second hub portion 334. For example, the first hub portion 332 may have a first end surface 360 and a second end surface 362. The first end surface 360 may engage the hub cap 330. The second end surface 362 may be disposed opposite the first end surface 360 and may engage the second hub portion 334. The first hub portion 332 may also include a set of holes 364, at least one slot 366, and one or more alignment pin openings 368.

The set of holes 364 may extend from the first end surface 360 toward the second end surface 362. In the configuration shown, the set of holes 364 are configured as through holes that extend from the first end surface 360 to the second end surface 362 to allow a mounting stud 340 to extend through the first hub portion 332.

One or more slots 366 may extend radially outward from an interior surface of the first hub portion 332. A slot 366 may receive a corresponding tab on a disc that may be provided with the friction clutch 310 as will be discussed in more detail below. For example, a plurality of slots 366 may be provided that may be arranged around the second axis 100 and may be spaced apart from each other. Each slot 366 may extend between the first end surface 360 and the second end surface 362 such that the slots 366 may be extend in an axial direction and may extend substantially parallel to the second axis 100.

Figure 17:
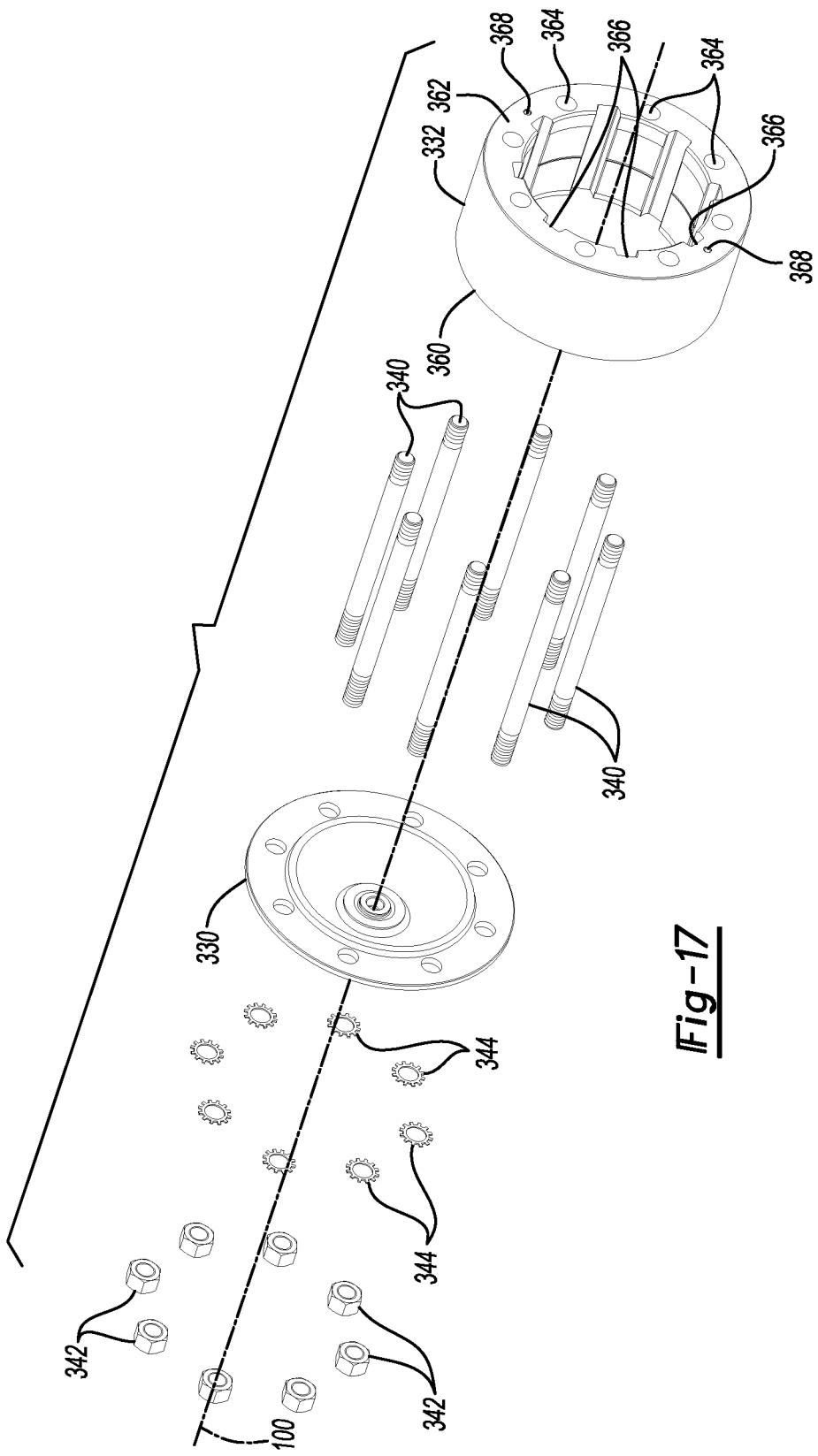
FIGS. 17-19 comprise an exploded view that depicts opposite sides of the components shown in FIGS. 14-16.

Referring to FIG. 17, one or more alignment pin openings 368 may extend from the second end surface 362. An alignment pin opening 368 may receive a corresponding alignment pin 370, which is best shown in FIGS. 15 and 18, that may be received in a corresponding alignment pin opening on the second hub portion 334 to help align the first hub portion 332 and the second hub portion 334.

Referring to FIGS. 13, 15, 18, and 20, the second hub portion 334 may receive at least a portion of the locking clutch 312, the locking clutch actuator 314, or both. The second hub portion 334 may be a separate component from the first hub portion 332; however, it is contemplated that the first hub portion 332 may be integrally formed with the second hub portion 334 in one or more embodiments. In at least one configuration, the second hub portion 334 may extend around the locking clutch 312, the locking clutch actuator 314, or both, and may extend in an axial direction from the first hub portion 332 to the third hub portion 336. For example, the second hub portion 334 may have a first end surface 380 and a second end surface 382. The first end surface 380 may engage the second end surface 362 of the first hub portion 332. The second end surface 382 may be disposed opposite the first end surface 380 and may engage the third hub portion 336. The second hub portion 334 may also include a set of holes 384, a hub gear 386, and one or more alignment pin openings 388.

Referring to FIGS. 15 and 18, the set of holes 384 may extend from the first end surface 380 toward the second end surface 382. In the configuration shown, the set of holes 384 are configured as through holes that extend from the first end surface 380 to the second end surface 382 to allow a mounting stud 340 to extend through the second hub portion 334.

Referring to FIGS. 15, 18, and 20, a hub gear 386 may extend from the second hub portion 334. For example, the hub gear 386 may be configured as a face gear that may include a set of teeth that may extend from the first end surface 380 in a direction that extends away from the second end surface 382. Alternatively, the hub gear 386 may be configured as a spline or set of teeth that may be disposed in the second hub portion 334 and that may extend toward the second axis 100. The set of teeth may be arranged around the second axis 100 and optionally around the locking clutch actuator 314 and may extend from an inside circumference of the second hub portion 334. As such, the hub gear 386 may be disposed closer to the second axis 100 than the holes 384. The teeth of the hub gear 386 may be selectively engaged by the locking clutch 312 as will be discussed in more detail below.

Referring to FIG. 15, one or more alignment pin openings 388 may extend from the first end surface 380. For example, an alignment pin opening 388 that is provided with the first end surface 380 may receive a corresponding alignment pin 370 to help align the first hub portion 332 and the second hub portion 334.

Referring to FIGS. 14, 16, 19, and 20, the third hub portion 336 may receive at least a portion of the spindle 74, the locking clutch actuator 314, or both. The third hub portion 336 may be a separate component from the second hub portion 334; however, it is contemplated that the second hub portion 334 may be integrally formed with the second hub portion 334 in one or more embodiments. In at least one configuration, the third hub portion 336 may extend around and may be spaced apart from the spindle 74, the locking clutch actuator 314, or both, and may be disposed on an opposite side of the second hub portion 334 from the first hub portion 332. For example, the third hub portion 336 may have a first end surface 390 and a second end surface 392. The first end surface 390 may engage the second end surface 382 of the second hub portion 334. The second end surface 392 may be disposed opposite the first end surface 390. The second hub portion 334 may also include a set of holes 394 and a hub mounting flange 396.

Referring to FIGS. 16 and 20, the set of holes 394 may extend from the first end surface 390 toward the second end surface 392. In the configuration shown, the set of holes 394 are configured as blind holes that receive mounting studs 340. The mounting studs 340 may be fixedly positioned with respect to the third hub portion 336. For instance, the set of holes 394 may have threads that may mate with corresponding threads on the mounting studs 340.

Referring to FIGS. 13, 16 and 20, the hub mounting flange 396 may extend away from the second axis 100. For instance, the hub mounting flange 396 may extend substantially perpendicular to the second axis 100 in one or more configurations. The hub mounting flange 396 may facilitate mounting of a wheel of the wheel assembly 20. For example, the hub mounting flange 396 may include a set of mounting lug fastener holes that may each receive a wheel mounting lug 400. As is best shown in FIG. 20, the wheel of the wheel assembly 20 may have a wheel mounting flange that may have a set of holes that may be aligned with the wheel mounting lugs 400. A lug nut 402 may be threaded onto each wheel mounting lug 400 to secure the wheel to the hub assembly 308.

Referring to FIG. 20, the hub cavity 338 may be disposed inside the hub assembly 308 and may extend between opposing ends of the hub assembly 308. For example, the hub cavity 338 may extend from the hub cap 330 to the seal assembly 306. The hub cavity 338 may receive at least a portion of an axle shaft 48 and may receive at least a portion of various components of the wheel end assembly 50, such as the spindle 74, first wheel bearing 300, the second wheel bearing 302, the preload nut 304, the seal assembly 306, the friction clutch 310, the locking clutch 312, the locking clutch actuator 314, the first biasing member 316, and the second biasing member 318.

Referring to FIGS. 15, 18, and 20, the friction clutch 310 may be adapted to provide friction that may allow the axle shaft 48 and the hub assembly 308 to achieve sufficiently similar rotational velocities about the second axis 100 or synchronize the rotational velocities of the axle shaft 48 and the hub assembly 308 about the second axis 100. In at least one configuration, the friction clutch 310 may include a disc pack 410, a disc pack hub 412, an actuation plate 414, and a retainer 416.

The disc pack 410 may be axially positioned between the actuation plate 414 and the locking clutch 312. In addition, the disc pack 410 may be radially positioned between the disc pack hub 412 and a portion of the hub assembly 308, such as the first hub portion 332. The disc pack 410 may include one or more inner friction discs 420 and one or more outer friction discs 422.

One or more inner friction discs 420 may be disposed on the disc pack hub 412 and may extend radially away from the second axis 100. For example, the inner friction discs 420 may have a hole that may receive the disc pack hub 412. The hole in an inner friction disc 420 may have a toothed profile that may engage and mate with a set of teeth on the disc pack hub 412 such that the inner friction disc 420 is rotatable about the second axis 100 with the disc pack hub 412.

One or more outer friction discs 422 may be disposed adjacent to an inner friction disc 420. The outer friction discs 422 may be spaced apart from each other such that an inner friction disc 420 may be disposed between adjacent outer friction discs 422. The outer friction discs 422 may extend from the hub assembly 308 toward the second axis 100 and may not rotate about the second axis 100 with respect to the hub assembly 308. For example, the outer friction discs 422 may extend from the first hub portion 332 toward the disc pack hub 412. The outer friction discs 422 may have an inside circumferential surface that may face toward and may extend around the second axis 100 such that the inner circumferential surface may be spaced apart from the disc pack hub 412. As is best shown in FIGS. 15 and 18, the outer friction discs 422 may have one or more tabs 424 that may extend away from the second axis 100 and may extend away from an outer surface or outside circumference of the outer friction disc 422. A tab 424 may be received in a corresponding slot 366 in the first hub portion 332 400. As such, a tab 424 may cooperate with a slot 366 to inhibit rotation of the outer friction discs 422 with respect to the first hub portion 332 while allowing deflection or limited axial movement of the outer friction discs 422.

The disc pack hub 412 may be received inside the disc pack 410. The disc pack hub 412 may be axially positioned between the actuation plate 414 and the locking clutch 312 and may be radially positioned between the axle shaft 48 and the disc pack 410. In at least one configuration, the disc pack hub 412 may include a first side surface 430, a second side surface 432, an inner surface 434, a set of disc pack hub teeth 436, and one or more fastener holes 438.

The first side surface 430 may face toward and may engage the actuation plate 414. The first side surface 430 may be disposed substantially perpendicular to the second axis 100 in one or more configurations.

The second side surface 432 may be disposed opposite the first side surface 430. The second side surface 432 may face toward the locking clutch 312 and may be selectively engaged by the locking clutch 312.

The inner surface 434 may extend from the first side surface 430 to the second side surface 432. The inner surface 434 may face toward the axle shaft 48 and may define a hole through which the axle shaft 48 may extend. The inner surface 434 may be spaced apart from the axle shaft 48.

The set of disc pack hub teeth 436 may be disposed opposite the inner surface 434. The disc pack hub teeth 436 may be arranged around the second axis 100 and may extend away from the second axis 100. In addition, the disc pack hub teeth 436 may extend between the first side surface 430 and the second side surface 432. The disc pack hub teeth 436 may mesh with the toothed profile of the inner friction discs 420 to inhibit rotation of the inner friction discs 420 about the second axis 100 with respect to the disc pack hub 412. The disc pack hub teeth 436 may be spaced apart from and may not engage the outer friction discs 422.

One or more fastener holes 438 may be provided with the disc pack hub 412. For instance, one or more fastener holes 438 may extend from the first side surface 430 toward the second side surface 432. Each fastener hole 438 may receive a corresponding fastener 440, such as a bolt, that may couple the disc pack hub 412 to the actuation plate 414. As such, the disc pack hub 412 may not rotate about the second axis 100 with respect to the actuation plate 414.

The actuation plate 414 may be disposed adjacent to the disc pack 410 and the disc pack hub 412. The actuation plate 414 may be axially positioned between the first biasing member 316 and the disc pack 410 and may be radially positioned between the axle shaft 48 and the hub assembly 308. In addition, the actuation plate 414 may be rotatable about the second axis 100 with the axle shaft 48. In at least one configuration, the actuation plate 414 may include an outboard side surface 450, an inboard side surface 452, and actuation plate spline 454, and one or more fastener holes 456.

The outboard side surface 450 may face toward the hub cap 330 and may engage the first biasing member 316.

The inboard side surface 452 may be disposed opposite the outboard side surface 450. The inboard side surface 452 may face toward the disc pack 410 and may engage the first side surface 430 of the disc pack hub 412. The inboard side surface 452 may selectively engage the disc pack 410 as will be discussed in more detail below.

The actuation plate spline 454 may extend between the outboard side surface 450 and the inboard side surface 452. The actuation plate spline 454 may include a plurality of teeth that may be arranged around the axle shaft 48 and that may extend toward the axle shaft 48. The teeth may be disposed substantially parallel to the second axis 100 and may mate with the teeth of the axle spline 292. As such, the actuation plate spline 454 may cooperate with the axle spline 292 to inhibit rotation of the actuation plate 414 about the second axis 100 with respect to the axle shaft 48 while allowing the actuation plate 414 to move axially or along the second axis 100 with respect to the axle shaft 48.

One or more fastener holes 456 may be provided with the actuation plate 414. For instance, one or more fastener holes 456 may extend from the outboard side surface 450 to the inboard side surface 452. Each fastener hole 456 may be aligned with a corresponding fastener hole 438 on the disc pack hub 412 may receive a corresponding fastener 440.

The retainer 416 may be disposed at an opposite end of the disc pack 410 from the actuation plate 414. As such, the retainer 416 may be axially positioned between the disc pack 410 and the locking clutch 312. The retainer 416 may be fixedly positioned with respect to the hub assembly 308. For example, the retainer 416 may be fixedly mounted in the first hub portion 332 and may extend toward the second axis 100. The retainer 416 may have any suitable configuration. For example, the retainer 416 may be configured as an end plate, washer, snap ring, or one or more protrusions that may extend from the hub assembly 308 toward the second axis 100. The retainer 416 may act as a stop that may inhibit axial movement of the disc pack 410 toward the locking clutch 312, or to the right from the perspective shown in FIG. 20. In at least one configuration, the retainer 416 may directly engage an end plate of the disc pack 410 or an outer friction disc 422 that is located at an end of the disc pack 410 that is located closest to the locking clutch 312.

Referring to FIGS. 15, 18 and 20, the locking clutch 312 may be rotatable about the second axis 100 with a corresponding axle shaft 48. The locking clutch 312 may be configured to selectively engage the hub assembly 308 to mechanically interlock the axle shaft 48 and the hub assembly 308. In addition, the locking clutch 312 may selectively engage the friction clutch 310 to actuate the friction clutch 310 as will be discussed in more detail below. The locking clutch 312 may be axially positioned between the friction clutch 310 and the locking clutch actuator 314. In at least one configuration, the locking clutch 312 may include a locking clutch spline 460, a locking clutch gear 462, an inner pocket 464, an outer pocket 466, and an engagement feature 468.

The locking clutch spline 460 may include a plurality of teeth that may be arranged around the axle shaft 48 and that may extend toward the axle shaft 48. The teeth may be disposed substantially parallel to the second axis 100 and may mate with the teeth of the axle spline 292. As such, the locking clutch spline 460 may cooperate with the axle spline 292 to inhibit rotation of the locking clutch 312 about the second axis 100 with respect to the axle shaft 48 while allowing the locking clutch 312 to move axially with respect to the axle shaft 48. The locking clutch spline 460 may also be radially positioned between axle shaft 48 and a portion of the locking clutch actuator 314, such as a piston of the locking clutch actuator 314.

The locking clutch gear 462 may be disposed proximate an outside circumference of the locking clutch 312. For example, the locking clutch gear 462 may be configured as a face gear that may include a set of teeth that may extend in an axial direction away from the friction clutch 310 and toward the hub gear 386 of the hub assembly 308. The set of teeth may be arranged around the second axis 100 and may extend around and may at least partially define the outer pocket 466. Alternatively, the locking clutch gear 462 may be configured as a spline or set of teeth that may be disposed opposite the locking clutch spline 460 and that may extend away from the second axis 100. The set of teeth of the locking clutch gear 462 may selectively engage the teeth of the hub gear 386 as will be discussed in more detail below.

The inner pocket 464 may extend around the axle shaft 48. The inner pocket 464 may be configured as a recess that may extend from an outboard side of the locking clutch 312 in an axial direction that extends away from the friction clutch 310. The inner pocket 464 may receive a portion of the second biasing member 318.

The outer pocket 466 may be disposed on an opposite side of the locking clutch 312 from the inner pocket 464 and may be disposed further from the second axis 100 than the inner pocket 464. The outer pocket 466 may extend around at least a portion of the locking clutch spline 460 and may receive a portion of the locking clutch actuator 314 in one or more embodiments.

Referring to FIGS. 15 and 20, the engagement feature 468 may face toward and may selectively engage the friction clutch 310. For example, the engagement feature 468 may face toward and may selectively engage the second side surface 432 of the disc pack hub 412. In the configuration shown, the engagement feature 468 is configured as a ring that may extend around the second axis 100 and may protrude an axial direction toward the friction clutch 310.

Referring to FIGS. 15, 18 and 20, the locking clutch actuator 314 may be operable to actuate the locking clutch 312 toward the friction clutch 310 or to the left from the perspective shown in FIG. 20. More specifically, the locking clutch actuator 314 may actuate the locking clutch 312 from a locked position to an unlocked position and to an intermediate position that may be disposed between the locked position and the unlocked position as will be discussed in more detail below. The locking clutch actuator 314 may be fixedly mounted to a portion of the housing assembly 30, such as the spindle 74. In such a configuration, the locking clutch actuator 314 may not rotate about the second axis 100 and may be spaced apart from the hub assembly 308. The locking clutch actuator 314 may be of any suitable type. For example, the locking clutch actuator 314 may be a pneumatic, hydraulic, electrical, or electromechanical actuator. In the configuration shown, the locking clutch actuator is depicted as a pneumatic actuator that may include a piston housing 470 and one or more pistons 472.

The piston housing 470 may be received inside the hub assembly 308 and may be fixedly disposed on the housing assembly 30. The piston housing 470 may have an annular configuration and may extend continuously around the axle shaft 48. In addition, the piston housing 470 may define one or more recesses that may receive one or more pistons 472. In at least one configuration, a single recess may be provided that may receive a corresponding piston 472. The single recess may or may not extend continuously around the second axis 100. In the configuration shown, the recess is depicted as an annular recess that extends continuously around the second axis 100 and is open in a direction that faces toward the locking clutch 312. The piston housing 470 may also include a passage 474, which is best shown in FIG. 20, that may be selectively fluidly connected to a pressurized gas source 476, such as via a conduit like a tube or hose. Pressurized gas may flow from the pressurized gas source 476 through the passage 474 and to the recess and may exert force on a piston 472 to actuate the piston 472 toward the friction clutch 310, or to the left from the perspective shown in FIG. 20. Pressurized gas may be vented from the passage 474 and hence from the recess to allow the piston 472 to move away from the friction clutch 310, or to the right from the perspective shown in FIG. 20.

One or more pistons 472 may be movably disposed on the piston housing 470. More specifically, a piston 472 may be movable in an axial direction with respect to the piston housing 470. In the configuration shown, a single piston 472 is provided that has an annular configuration that may extend continuously around the second axis 100; however, it is also contemplated that the piston may also be configured to not extend continuously around the second axis 100. The piston 472 may have a first end surface and a second end surface that may be disposed opposite the first end surface. The first end surface may face toward the locking clutch 312. The second end surface may face away from locking clutch 312 and may be received in the recess. One or more seals 478 may be provided with the piston 472, the piston housing 470, or both, to inhibit the leakage of fluid between the piston 472 and the piston housing 470.

A thrust bearing 480 may be provided between the locking clutch 312 and a piston 472. For example, the thrust bearing 480 may be axially positioned between the locking clutch 312 and the first end of the piston 472. The thrust bearing 480 may facilitate rotation of the locking clutch 312 with respect to the piston 472

The first biasing member 316 may bias the actuation plate 414 toward the locking clutch 312. As such, the first biasing member 316 may urge the friction clutch 310 toward an engaged position in which the actuation plate 414 compresses the disc pack 410 to engage the inner friction discs and outer friction discs, such as in an axial direction to the right from the perspective shown in FIG. 20. The first biasing member 316 may be of any suitable type. For example, the first biasing member 316 may be configured as a diaphragm washer, one or more springs, or the like. As is best shown in FIG. 20, the first biasing member 316 may be axially positioned between the hub cap 330 and the actuation plate 414 and may actuate the friction clutch 310 toward the engaged position when sufficient force is not exerted by the locking clutch 312 against the friction clutch 310. The first biasing member 316 may extend axially from the actuation plate 414 to a retainer feature 490, such as a washer, snap ring or combination thereof, that may be received in the first groove 294 of the axle shaft 48.

The second biasing member 318 may bias the locking clutch 312 toward the hub gear 386 of the hub assembly 308. More specifically, the second biasing member 318 may actuate the locking clutch 312 toward the locked position when sufficient force is not exerted by the locking clutch actuator 314. As such, the second biasing member 318 may urge the locking clutch 312 toward a locked position in which the locking clutch gear 462 of the locking clutch 312 meshes with the hub gear 386 of the hub assembly 308, or in an axial direction to the right from the perspective shown in FIG. 20. The second biasing member 318 may be located at an opposite side of the actuation plate 414 from the first biasing member 316 and may be axially positioned between the actuation plate 414 and the locking clutch 312. In addition, the second biasing member 318 may extend from the locking clutch 312 toward the actuation plate 414. The second biasing member 318 may be of any suitable type. For example, the second biasing member 318 may be configured as one or more springs or the like. In at least one configuration, the second biasing member 318 may be configured as a spring that may extend around the axle shaft 48 and may extend from the locking clutch 312 to a retainer feature 492, such as a washer, snap ring or combination thereof, that may be received in the second groove 296 of the axle shaft 48. Accordingly, the second biasing member 318 may be spaced apart from and may not engage the friction clutch 310 and may not exert a biasing force on the friction clutch 310.

Figure 21:
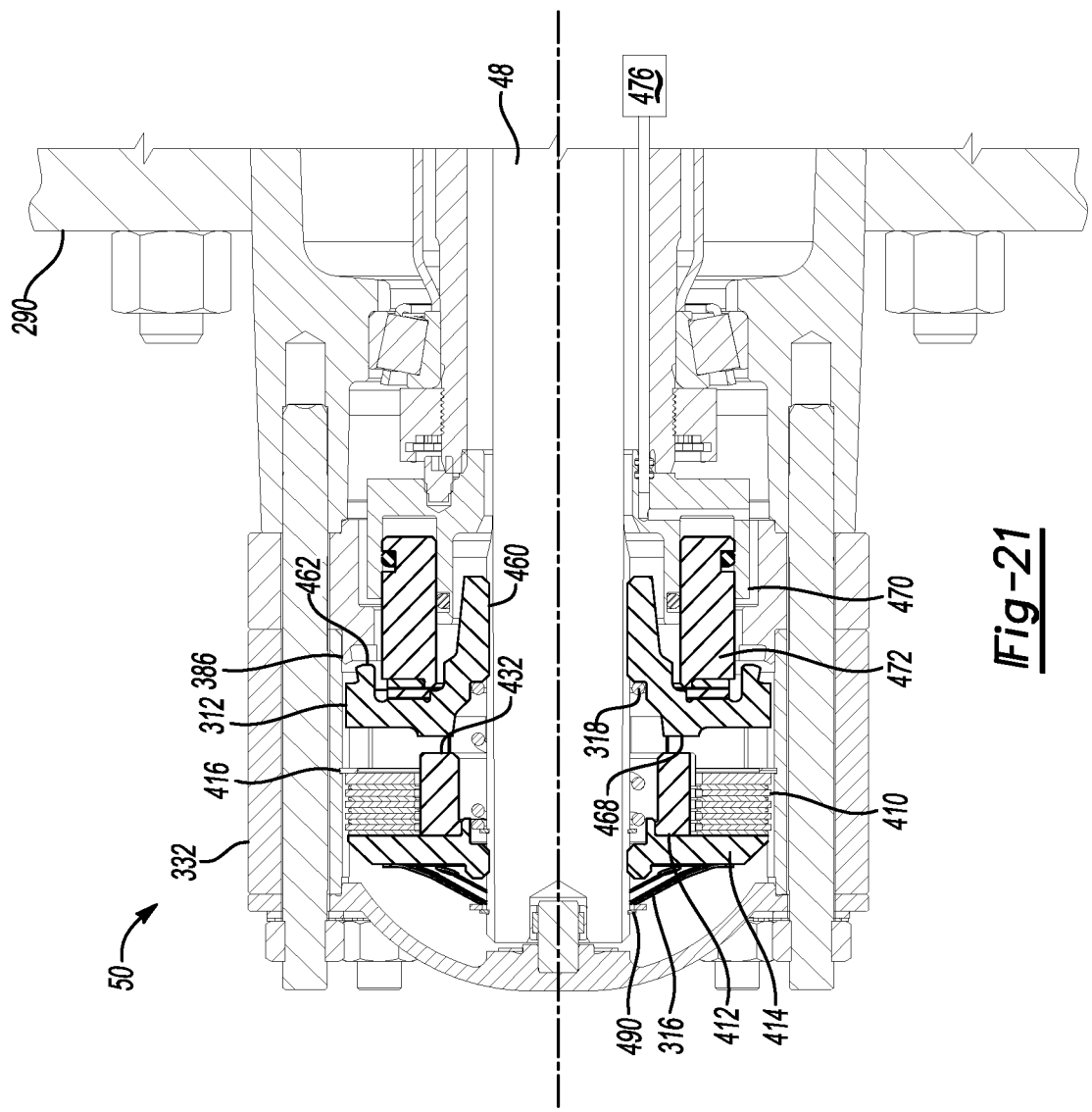
FIG. 21 is a section view showing the locking clutch in an intermediate position and the friction clutch in the engaged position.
Figure 22:
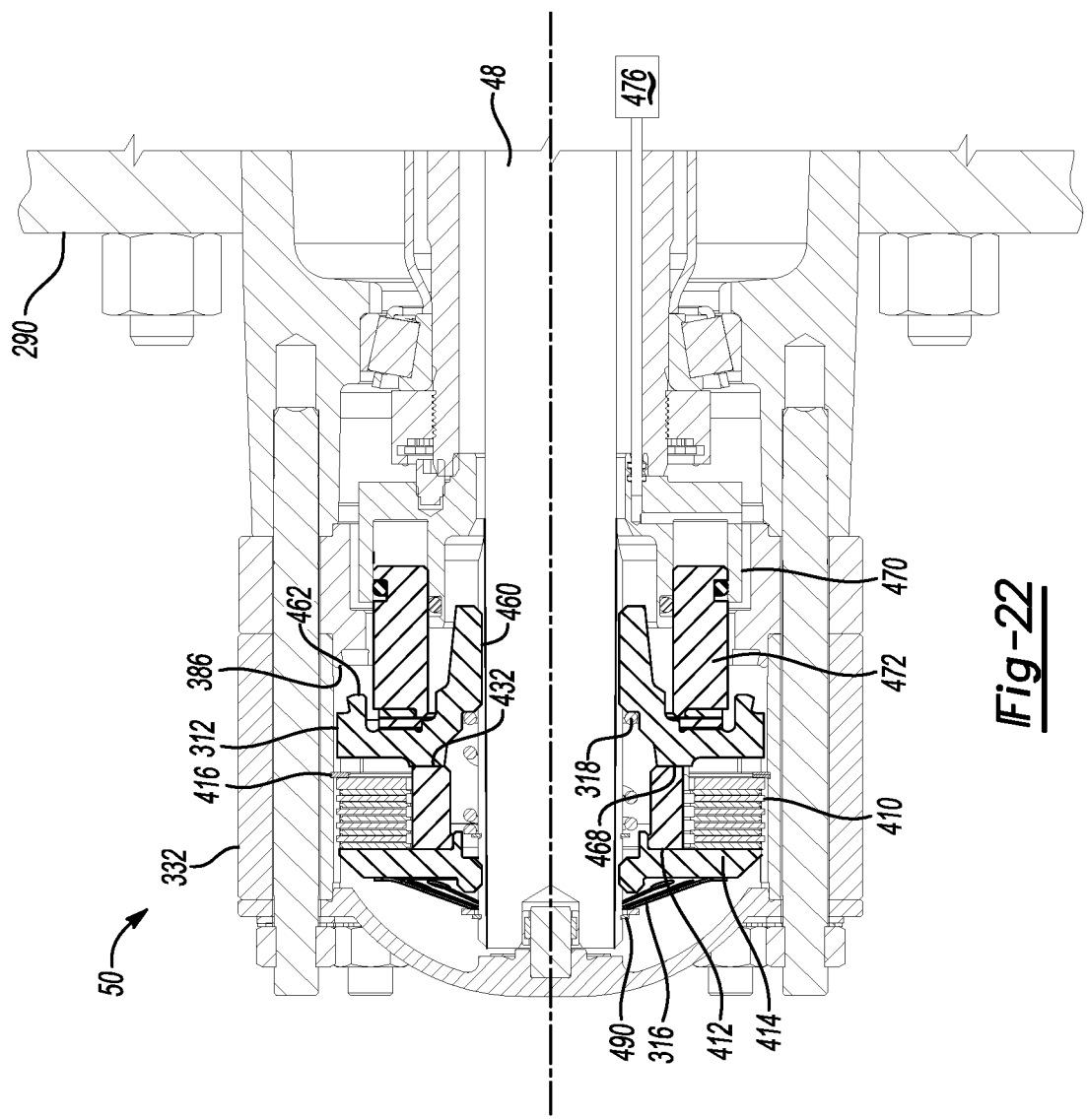
FIG. 22 is a section view showing the locking clutch in an unlocked position and the friction clutch in a disengaged position.

Referring to FIGS. 20-22, a method of control and operation of the wheel end assembly 50 will now be described in more detail. As an overview, the friction clutch 310 and the locking clutch 312 may be operable to disconnect an axle shaft 48 from a corresponding hub assembly 308 such that no torque or negligible torque is transmitted between the axle shaft 48 to the hub assembly 308. In addition, the friction clutch 310 and the locking clutch 312 may cooperate to connect an axle shaft 48 to a corresponding hub assembly 308 so that torque may be transmitted between the axle shaft 48 and the hub assembly 308 or from the axle shaft 48 to the hub assembly 308. More specifically, the friction clutch 310 may be engaged to allow the axle shaft 48 and the hub assembly 308 to rotate together about the second axis 100 to obtain the same or substantially similar rotational velocities prior to locking the locking clutch 312 to the hub assembly 308 to more robustly transmit torque between the axle shaft 48 and the hub assembly 308 by way of the locking clutch 312.

The friction clutch 310 may be movable between an engaged position and a disengaged position. The locking clutch 312 may be movable between three positions, which are referred to as a locked position, an intermediate position, and an unlocked position. The intermediate position may be axially positioned between the locked position and the unlocked position.

Referring to FIG. 20, the axle assembly is shown with the friction clutch 310 in an engaged position and the locking clutch 312 in a locked position. Torque may be transmitted between the axle shaft 48 and the hub assembly 308 via the friction clutch 310 when the friction clutch 310 is in the engaged position. In the engaged position, the locking clutch 312 is spaced apart from the friction clutch 310 under the biasing force of the second biasing member 318 and the first biasing member 316 exerts a biasing force on the actuation plate 414 that actuates the actuation plate 414 toward the locking clutch 312 to compress and engage the disc pack 410. Torque may also be transmitted between the axle shaft 48 and the hub assembly 308 via the locking clutch 312 when the locking clutch 312 is in the locked position. In the locked position, the second biasing member 318 exerts a biasing force on the locking clutch 312 that actuates the locking clutch 312 away from the friction clutch 310 so that the locking clutch gear 462 meshes with the hub gear 386 of the hub assembly 308. As such, torque may be transmitted between the axle shaft 48 and the hub assembly 308 by way of the meshed teeth of the locking clutch gear 462 and the hub gear 386. The locking clutch actuator 314 may be disposed in a retracted position in which the locking clutch actuator 314 does not exert sufficient force on the locking clutch 312 to overcome the biasing force of the second biasing member 318, such as when pressurized gas is not provided to the piston housing 470.

Referring to FIG. 21, the axle assembly is shown with the friction clutch 310 in the engaged position and the locking clutch 312 in the intermediate position. In the intermediate position, the locking clutch actuator 314 is actuated toward the friction clutch 310 or to the left from the perspective shown such that (1) the locking clutch gear 462 disengages from the hub gear 386 of the hub assembly 308 and (2) the locking clutch 312 does not actuate the friction clutch 310 from its disengaged position. As such, torque may not be transmitted between the axle shaft 48 and the hub assembly 308 via the locking clutch 312 when the locking clutch 312 is in the intermediate position. For example, a predetermined amount of pressurized fluid may be provided to actuate the piston 472 from its retracted position such that the locking clutch 312 moves from the locked position to the intermediate position without reaching the unlocked position. The locking clutch 312 may or may not engage the friction clutch 310 when the locking clutch 312 is in the intermediate position. Moreover, the friction clutch 310 may not be actuated by the locking clutch 312 in the intermediate position. As such, torque may not be transmitted between the axle shaft 48 and the hub assembly 308 via the friction clutch 310.

Referring to FIG. 22, the axle assembly is shown with the friction clutch 310 in a disengaged position and the locking clutch 312 in the unlocked position. Torque may not be transmitted between the axle shaft 48 and the hub assembly 308 via the friction clutch 310 when the friction clutch 310 is in the disengaged position or insufficient torque may be transmitted between the axle shaft 48 and the hub assembly 308 via the friction clutch 310 to rotate the hub assembly 308 when the friction clutch 310 is in the disengaged position. In the disengaged position, the locking clutch 312 may engage the friction clutch 310 and may overcome the biasing force exerted by the first biasing member 316 and the second biasing member 318 to actuate the disc pack hub 412 and the actuation plate 414 toward the hub cap 330, or to the left from the perspective shown in FIG. 22, to decompress, release, or disengage the discs of the disc pack 410. As such, no torque or insufficient torque may be transmitted between the axle shaft 48 and the hub assembly 308 via the friction clutch 310 when the friction clutch 310 is in the disengaged position. For example, an additional amount of pressurized fluid may be provided to further actuate the piston 472 to move the locking clutch 312 from the intermediate position to the unlocked position, or further to the left from the perspective shown as compared to FIG. 21. As such, the locking clutch 312 may engage or contact the disc pack hub 412 of the friction clutch 310, compress the second biasing member 318, and exert force on the disc pack hub 412 to actuate the friction clutch 310 to the disengaged position. The actuation plate 414 may move away from the retainer 416 to allow the discs of the disc pack 410 to move apart and may compress the first biasing member 316. As such, the hub assembly 308 may be rotatable with respect to the axle shaft 48 when the friction clutch 310 is in the disengaged position and the locking clutch 312 is in the unlocked position.

The axle shaft 48 may be reconnected to the hub assembly 308 by effectively reversing the sequence of steps described above. For instance, pressurized gas may be vented to allow the piston 472 to retract and the locking clutch 312 to return to the intermediate position under the biasing force of the second biasing member 318. Movement of the locking clutch 312 to the intermediate position may reduce or eliminate the force exerted by the locking clutch 312 against the disc pack hub 412. The disc pack hub 412 and actuation plate 414 may then move from the disengaged position to the engaged position to compress and reengage the discs of the disc pack 410 under the biasing force of the first biasing member 316. As a result, torque may be transmitted between the axle shaft 48 and the hub assembly 308 via the friction clutch 310. The locking clutch 312 may be held in the intermediate position before moving to the locked position. For instance, the locking clutch 312 may be held in the intermediate position until the rotational velocity of the hub assembly 308 is sufficiently close to the rotational velocity of the axle shaft 48. The rotational velocity of the hub assembly 308 may be sufficiently close to the rotational velocity of the axle shaft 48 when the rotational velocity of the hub assembly 308 is within a threshold amount from the rotational velocity of the axle shaft 48. The threshold amount may represent a tolerance or velocities at which the locking clutch gear 462 is re-engageable with the hub gear 386 of the hub assembly 308. For instance, the threshold amount may be when the rotational velocities are about 5% or less from each other. Alternatively, a rotational velocity of the hub assembly 308 that is sufficiently close the rotational velocity of the axle shaft 48 may be obtained by holding the locking clutch 312 in the intermediate position for a predetermined period of time. The threshold amount or predetermined period of time may be based on system performance requirements or determined by vehicle development testing. Finally, additional pressurized gas may be vented to allow the piston 472 to return to its retracted position, thereby allowing locking clutch 312 to move from the intermediate position to the locked position under the biasing force of the second biasing member 318. As a result, the axle shaft 48 may be mechanically coupled to the hub assembly 308 via the locking clutch 312 such that torque is transmitted between the axle shaft 48 and the hub assembly.

It is further noted that for a locking clutch actuator 314 having a pneumatic or hydraulic configuration, the friction clutch 310 and locking clutch 312 will move to or remain in the disengaged and locked positions, respectively when a sufficient amount of pressurized fluid cannot be provided to actuate the piston, such as in the event of a leak, performance issue with the pressurized gas source 476, or a supply valve that cannot be actuated from a closed position. As such, the wheel end assembly will default to a connected state in which an axle shaft 48 is operatively connected to a hub assembly 308 to facilitate the transmission of torque therebetween.

Figure 23:
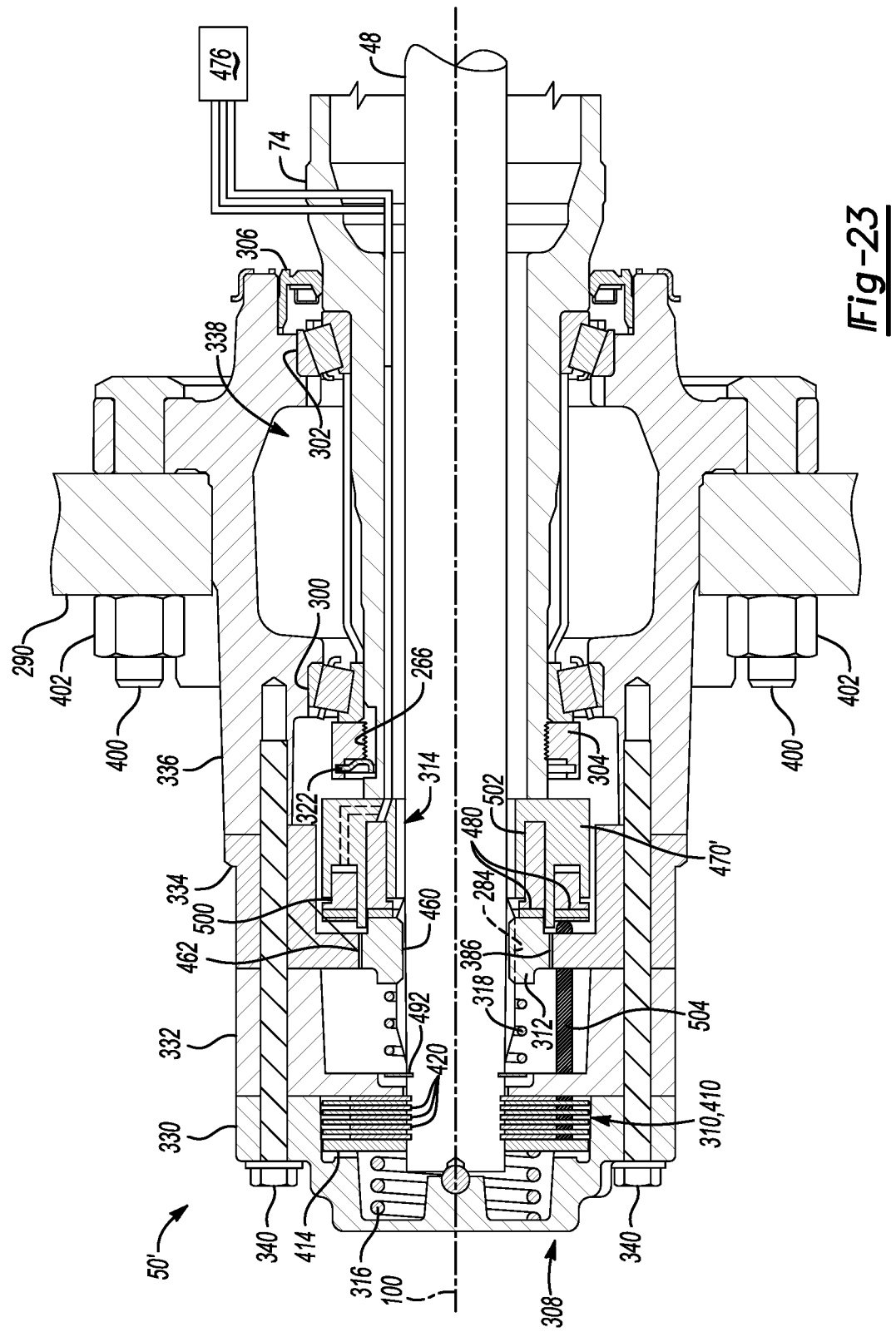
FIG. 23 is a section view of another configuration of a wheel end disconnect showing a locking clutch in a locked position and a friction clutch in an engaged position.
Figure 24:
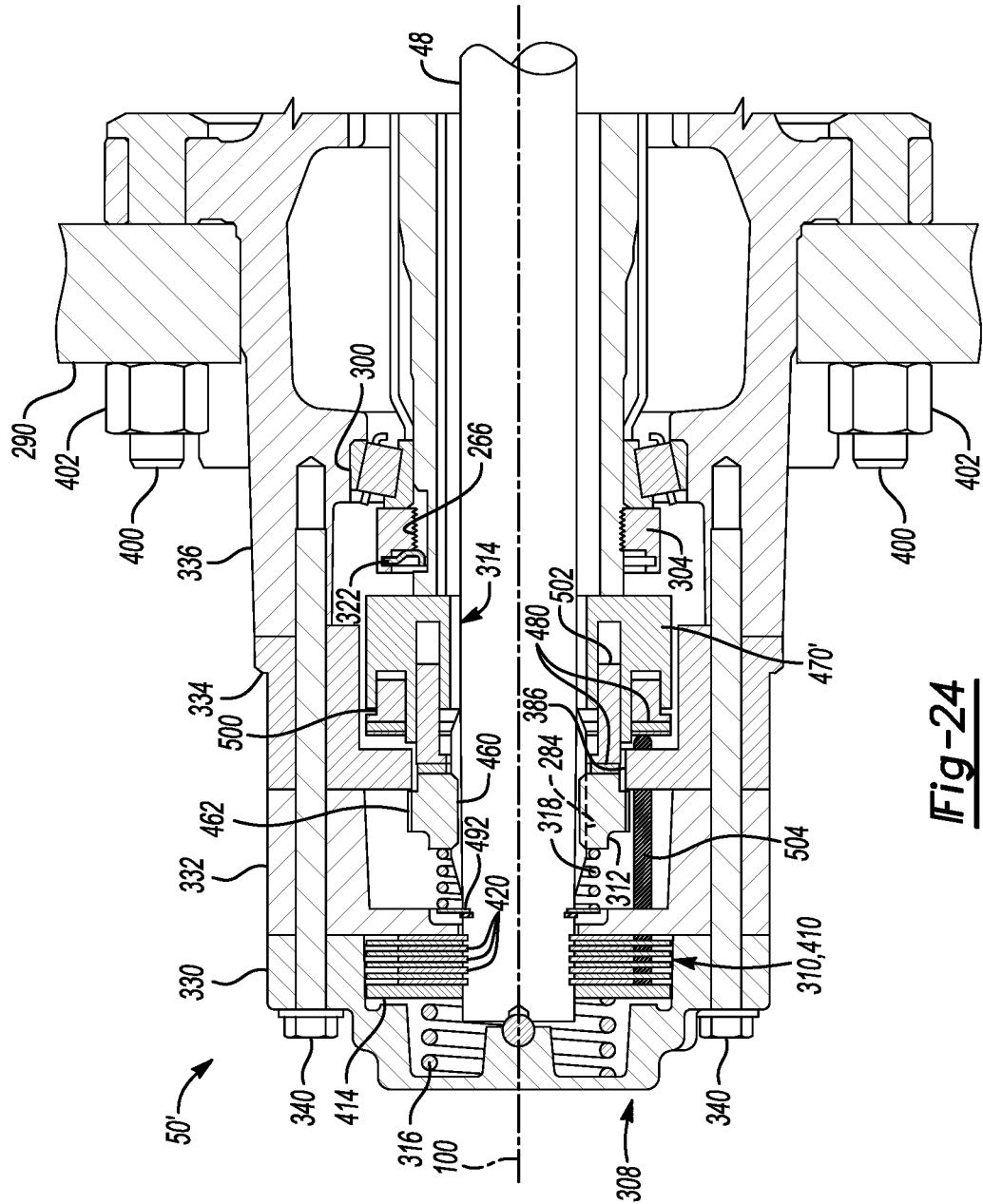
FIG. 24 is a section view of the wheel end disconnect of FIG. 23 showing the locking clutch in an unlocked position and the friction clutch in the engaged position.
Figure 25:
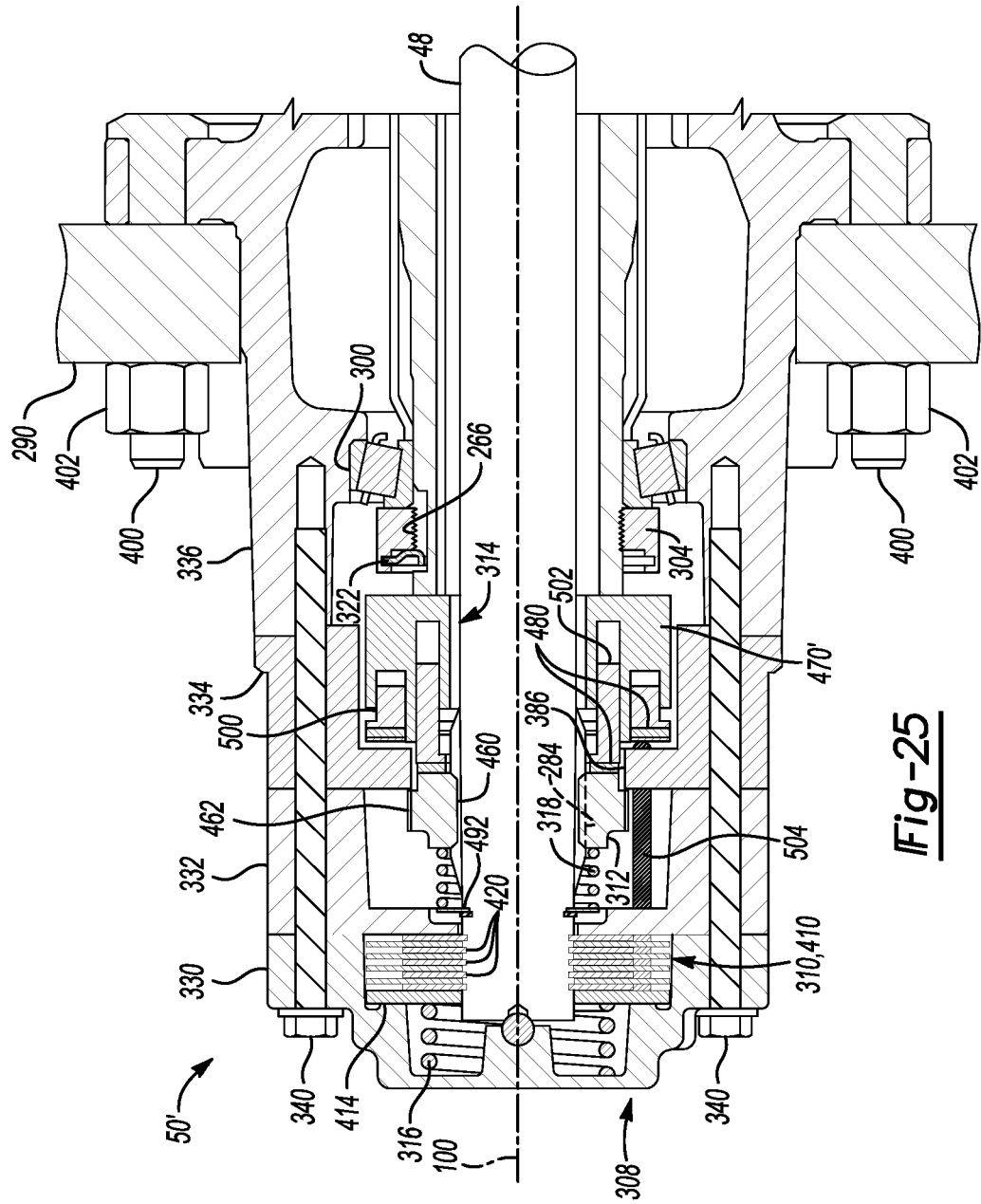
FIG. 25 is a section view of the wheel end disconnect of FIG. 23 showing the locking clutch in an unlocked position and the friction clutch in a disengaged position.

Referring to FIGS. 23-25, another configuration of a wheel end assembly 50' is shown. This configuration is similar to the configuration previously discussed, but includes two pistons that can be independently actuated to independently move a friction clutch and a locking clutch. As such, the friction clutch and the locking clutch may be spaced apart from each other at all actuation positions and the locking clutch may move between unlocked and locked positions without pausing at an intermediate position.

Referring to FIG. 23, the axle assembly is shown with the friction clutch 310 in an engaged position and the locking clutch 312 in a locked position. Torque may be transmitted between the axle shaft 48 and the hub assembly 308 via the friction clutch 310 when the friction clutch 310 is in the engaged position. In the engaged position, the locking clutch 312 may be biased away from the friction clutch 310 under the biasing force of the second biasing member 318, and the first biasing member 316 may exert a biasing force on the actuation plate 414 that actuates the actuation plate 414 toward the locking clutch 312 to compress and engage the disc pack 410. In the configuration shown, the inner friction discs 420 of the friction clutch 310 may be coupled to the axle shaft 48, such as with mating splines, and the disc pack hub may be eliminated. In addition, the first biasing member 316 is depicted as a coil spring that extends from the actuation plate 414 to the hub cap 330. Torque may also be transmitted between the axle shaft 48 and the hub assembly 308 via the locking clutch 312 when the locking clutch 312 is in the locked position. In the locked position, the second biasing member 318 exerts a biasing force on the locking clutch 312 that actuates the locking clutch 312 away from the friction clutch 310 so that the locking clutch gear 462 meshes with the hub gear 386 of the hub assembly 308. As such, torque may be transmitted between the axle shaft 48 and the hub assembly 308 by way of the meshed teeth of the locking clutch gear 462 and the hub gear 386. The locking clutch actuator 314 may be disposed in a retracted position in which the locking clutch actuator 314 does not exert sufficient force on the locking clutch 312 to overcome the biasing force of the second biasing member 318, such as when pressurized gas is not provided to the piston housing 470.

The locking clutch actuator 314 may include a piston housing 470' that may include separate recesses that may receive an outer piston 500 and an inner piston 502. The recesses may not be fluidly connected, which may allow the inner piston 502 to be actuated independently of the outer piston 500. Each recess may be selectively fluidly connected to the pressurized gas source 476 via separate passages in the piston housing 470', separate conduits that extend from the piston housing 470', or both. The outer piston 500 may be disposed further from the second axis 100 than the inner piston 502. In addition, the outer piston 500 may extend continuously around the inner piston 502. The outer piston 500 may be configured to actuate the friction clutch 310 via one or more rods 504 that may extend between the outer piston 500 and the friction clutch 310. The rod 504 may be positioned further away from the second axis 100 than the locking clutch 312 and may extend through openings in the inner friction discs 420 and the outer friction discs 422 of the disc pack 410 and extend to the actuation plate 414. A thrust bearing 480 may be provided between the outer piston 500 and an end of the rod 504 to facilitate rotational movement of the rod 504 with respect to the outer piston 500.

Referring to FIG. 24, the axle assembly is shown with the friction clutch 310 in the engaged position and the locking clutch 312 in the unlocked position. In the unlocked position, the inner piston 502 is actuated toward the friction clutch 310 or to the left from the perspective shown such that the locking clutch gear 462 disengages from the hub gear 386 of the hub assembly 308. As such, torque may not be transmitted between the axle shaft 48 and the hub assembly 308 via the locking clutch 312 when the locking clutch 312 is in the unlocked position. For example, pressurized fluid may be provided to actuate the inner piston 502 from its retracted position such that the locking clutch 312 moves from the locked position to the unlocked position.

Referring to FIG. 25, the axle assembly is shown with the friction clutch 310 in a disengaged position and the locking clutch 312 in the unlocked position. Torque may not be transmitted between the axle shaft 48 and the hub assembly 308 via the friction clutch 310 when the friction clutch 310 is in the disengaged position or insufficient torque may be transmitted from the axle shaft 48 to the hub assembly 308 via the friction clutch 310 to rotate the hub assembly 308 when the friction clutch 310 is in the disengaged position. In the disengaged position, the outer piston 500 may exert force against a first end of the rod 504, which may actuate the rod 504 toward the hub cap 330. Force may be transmitted from the rod 504 to the actuation plate 414 and may overcome the biasing force exerted by the first biasing member 316 to actuate the actuation plate 414 toward the hub cap 330, or to the left from the perspective shown in FIG. 25, to decompress, release, or disengage the discs of the disc pack 410. As such, no torque or insufficient torque may be transmitted between the axle shaft 48 and the hub assembly 308 via the friction clutch 310 when the friction clutch 310 is in the disengaged position. Movement of the actuation plate 414 to the left from the configuration shown may allow the discs of the disc pack 410 to move apart and may compress the first biasing member 316. As such, the hub assembly 308 may be rotatable with respect to the axle shaft 48 when the friction clutch 310 is in the disengaged position and the locking clutch 312 is in the unlocked position.

The axle shaft 48 may be reconnected to the hub assembly 308 by effectively reversing the sequence of steps described above. For instance, pressurized gas may be vented to allow the outer piston 500 to retract. The actuation plate 414 and the rod 504 may move from their previous positions to the right from the perspective shown to compress and reengage the discs of the disc pack 410 under the biasing force of the first biasing member 316. As a result, torque may be transmitted between the axle shaft 48 and the hub assembly 308 via the friction clutch 310. The locking clutch 312 may be held in the unlocked position until the rotational velocity of the hub assembly 308 is sufficiently close to the rotational velocity of the axle shaft 48 as previously discussed. Finally, pressurized gas may be vented to allow the inner piston 502 to return to its retracted position, thereby allowing locking clutch 312 to move from the unlocked position to the locked position under the biasing force of the second biasing member 318. As a result, the axle shaft 48 may be mechanically coupled to the hub assembly 308 via the locking clutch 312 such that torque is transmitted between the axle shaft 48 and the hub assembly.

Referring to FIG. 1, a control system 550 may monitor and/or control operation of the drive axle system 12. The control system 550 may include one or more electronic controllers that may monitor and/or control various components of the drive axle system 12. For example, the control system 550 may be configured to control actuation of the shift collar 44 to operatively connect the drive pinion 36 to the torque source 18 such that torque may be transmitted from the torque source 18 to the differential 46 and to operatively disconnect the drive pinion 36 from the torque source 18 such that torque may not be transmitted from the torque source 18 to the differential 46. The control system 550 may also control actuation or operation of the wheel end disconnects to connect or disconnect a differential 46 from a corresponding hub assembly 308 to permit or prevent the transmission of torque between a differential 46 and the hub assembly 308. In the discussion below, the control system 550 and associated methods of control will be primarily described in the context of disconnecting and connecting the first drive axle assembly 14. However, it is to be understood that another axle assembly, such as the second drive axle assembly 16 may be operatively connectable to and disconnectable from the torque source 18 and may have the wheel end disconnects operable to connect and disconnect its differential from its corresponding hub assemblies or wheel assemblies.

Figure 26:
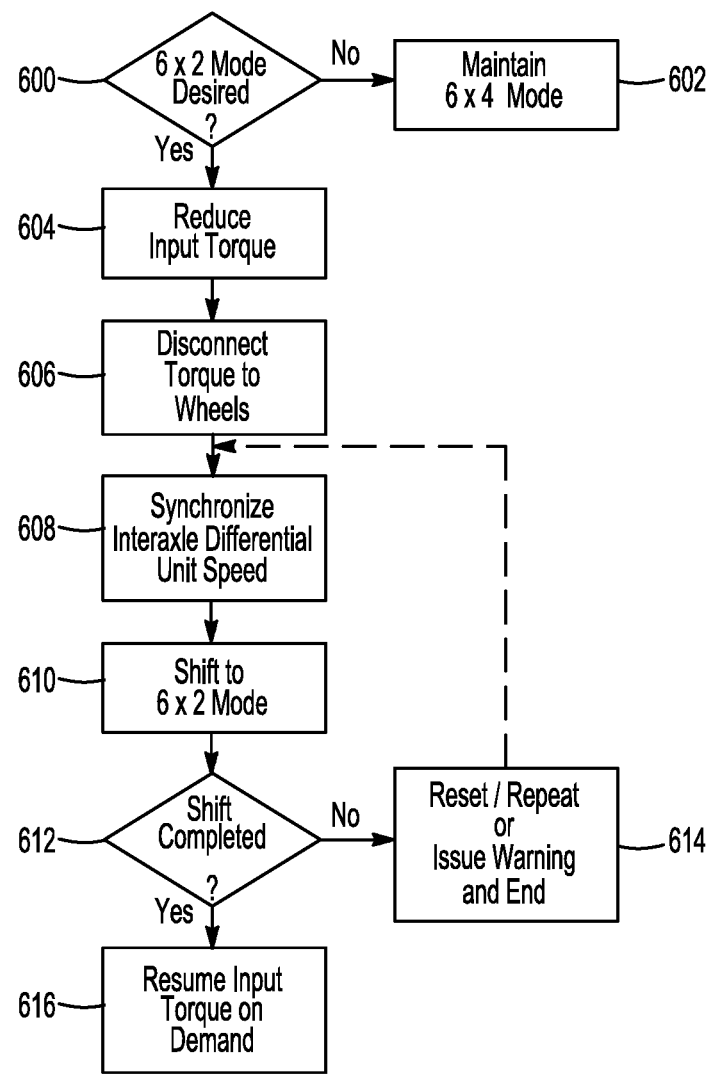
FIG. 26 is a flowchart of a method of controlling the drive axle system to engage a two-wheel drive operating mode.

Referring to FIG. 26, a flowchart of a method of controlling a drive axle system is shown. The methodology shown in FIG. 26 may represent actions or steps associated with shifting from a multi-axle drive mode, such as a four-wheel drive mode or "6×4" mode in which propulsion torque is provided to the first drive axle assembly 14 and the second drive axle assembly 16, to a reduced axle drive mode, such as a two-wheel drive mode or "6×2" mode in which propulsion torque is not provided to the wheel assemblies of one axle assembly but can be provided to the wheels of another axle assembly. Discussion of the method shown in FIG. 26 will be described in the context of the drive axle system being a tandem axle system having first and second drive axle assemblies and the drive modes being a four-wheel drive mode and a two-wheel drive mode. In addition, the axle system will be described starting in the four-wheel drive mode.

At block 600, the method may determine whether a two-wheel drive mode is desired. The determination of whether a two-wheel drive mode is desired may be manually controlled or automatically determined. For example, a two-wheel drive mode may be manually selected based on an operator input, such as activating or requesting a shift to the two-wheel drive mode by actuating a switch. The two-wheel drive mode may be automatically selected or activated by the control system 550. For example, a shift from the four-wheel drive mode to the two-wheel drive mode may be desired when torque can be provided to fewer axle assemblies to propel or accelerate the vehicle, such as may be the case when the vehicle is cruising at a constant or relatively constant speed, is on substantially flat or level terrain, or combinations thereof. As an example, the control system 550 may automatically initiate a shift from the four-wheel drive mode to the two-wheel drive mode when the vehicle speed is above a predetermined speed (e.g., 30 mph), the road grade is less than a predetermined road grade amount, a cruise control system is activated, the acceleration or torque requested by an operator or the cruise control system is less than a predetermined amount, or combinations thereof. If the two-wheel drive mode is not desired, then the method may continue at block 602. If the two-wheel drive mode is desired, then the method may continue at block 604.

At block 602, the four-wheel drive mode may be maintained and the method or iteration of the method may end.

At block 604, the input torque to the drive axle system may be reduced. The input torque to the drive axle system may be the torque that is provided by the torque source 18. The input torque may be reduced to reduce the torque on downstream components such as the wheel end disconnects to allow or make it easier for the wheel end disconnects to be disengaged. The input torque to the drive axle system may be reduced in various ways. For example, output of the torque source 18 may be reduced, a transmission may be shifted to neutral, or a clutch disposed upstream from the drive axle system 12 may be opened. Such a clutch may be provided with the torque source 18 (e.g., an engine clutch or clutch that may disengage an engine crankshaft), between an engine and a transmission, or between the torque source 18 and the first drive axle assembly 14.

At block 606, the transmission of torque to the wheel assemblies of an axle assembly may be discontinued or disconnected. More specifically, the wheel end disconnects of the wheel end assemblies of a drive axle assembly may be operated to discontinue the transmission of torque from a corresponding differential to its corresponding wheel assemblies 20. For example, a friction clutch 310 may be actuated to the disengaged position and the locking clutch 312 may be actuated to the unlocked position in a wheel end disconnect having the configuration shown in FIG. 21. Optionally, this step may also include confirming whether the transmission of torque from a differential 46 to its wheel assemblies 20 has been successfully completed. For example, one or more sensors may be provided that may directly detect the position of the clutches associated with a wheel end disconnect to confirm that sufficient clutch movement has occurred to disconnect the transmission of torque. As another example, a sensor may be provided that may detect the pressure or current provided to an actuator that may actuate the clutches to indirectly determine whether sufficient clutch movement has occurred to disconnect the transmission of torque. As another example, a speed sensor such as a wheel speed sensor may be provided to detect a change in the rotational velocity of a wheel assembly 20 or a hub assembly 308 to determine whether the wheel assembly 20 or hub assembly 308 has been disconnected from the differential 46. It is noted that block 606 may be executed concurrently or sequentially with block 604.

At block 608, the rotational speed at or across the interaxle differential unit may be synchronized. For example, the speed across the interaxle differential unit 42 may be adjusted if necessary to permit the shift collar 44 to be shifted. As an example, the rotational speed of the sun gear 170 of the interaxle differential unit 42 may be adjusted to match or be sufficiently close to the rotational speed of the drive pinion 36 to permit the shift collar 44 to move from the first position in which the shift collar 44 may operatively connect the sun gear 170 to the drive pinion 36, to the second position in which the shift collar 44 does not operatively connect the sun gear 170 to the drive pinion 36, thereby discontinuing the transmission of torque to the differential 46. Accordingly, the term "synchronized" may mean that the rotational speed of two components may be sufficiently close so as to permit and complete a shift, such as being sufficiently close as to allow the shift collar 44 to be shifted, and may not require exactly the same rotational speed. The rotational speed at or across the interaxle differential unit 42 may be synchronized by adjusting the input torque or rotational speed of the input shaft 34, such as by increasing the rotational speed of the torque source 18.

At block 610, the differential may be disconnected from the torque source. More specifically, the differential 46 of the drive axle assembly having the wheel end disconnects may be decoupled from the torque source 18 so that torque is not transmitted to spin the differential 46. Disconnecting the differential 46 from its torque source 18 may isolate the differential 46 and reduce or eliminate associated rotational drag losses from rotating associated components, such as the drive pinion 36, differential 46, and optionally its associated axle shafts 48 depending on the location of the wheel end disconnects. In addition, disconnecting the differential 46 from its torque source 18 may reduce or eliminate drag associated with rotating the differential 46 through lubricant in the sump portion of the housing assembly 30. The differential 46 may be disconnected by actuating or moving the shift collar 44 from the first position to the second position.

At block 612, the method may determine whether the differential 46 has successfully been disconnected from the torque source 18 or that the shift collar 44 has successfully moved to the second position. For example, one or more sensors may be provided that may directly detect the position of shift collar 44 to confirm that the shift collar 44 is in the second position. As another example, one or more sensors may be provided that indirectly determine the position of the shift collar 44. For instance, a sensor may be provided that may detect the pressure or current provided to an actuator that may actuate the shift collar 44 to indirectly determine whether sufficient movement has occurred and that the shift collar 44 is in the second position. As another example, a speed sensor, such as a speed sensor that may detect rotation or the rotational speed of the drive pinion 36, differential 46, axle shaft 48, or combinations thereof, may be provided to determine whether rotation or the rotational speed of one or more of these components has decreased in a manner that is indicative that torque is no longer being received from the interaxle differential unit 42. If the shift collar 44 has not completed its shift to the second position or torque transmission from the interaxle differential unit 42 to the differential 46 has not been successfully disconnected, then the method may continue at block 614. If the shift collar 44 has completed its shift to the second position and differential 46 has been successfully disconnected, then the method may continue at block 616.

At block 614, the method may attempt to reset or repeat shifting of the shift collar 44 to the second position. For instance, the method may return to block 608 as represented by the dashed arrowed line and may maintain or resynchronize the interaxle differential unit speed and reattempt to shift the shift collar 44. This loop may be repeated for a predetermined number of times. As a nonlimiting example, the loop may be repeated three times after which a warning or alert may be issued to the operator and the attempt to shift the shift collar 44 to the second position may be terminated. Optionally, the method may also take actions to reengage the disconnected wheel end disconnects to return to the four-wheel-drive operating mode if a shift cannot be completed.

At block 616, the transition to the two-wheel drive mode has been completed. The torque source 18 is operatively connected to the drive axle assembly that has not been disconnected, but the torque source 18 may not operatively connected to the differential 46 or wheel assemblies of the other drive axle assembly. As such, fuel consumption may be reduced. An operator or the control system may resume or provide input torque to the drive axle system and the connected drive axle assembly on demand to respond to increases or decreases in the requested or desired speed of the vehicle.

Figure 27:
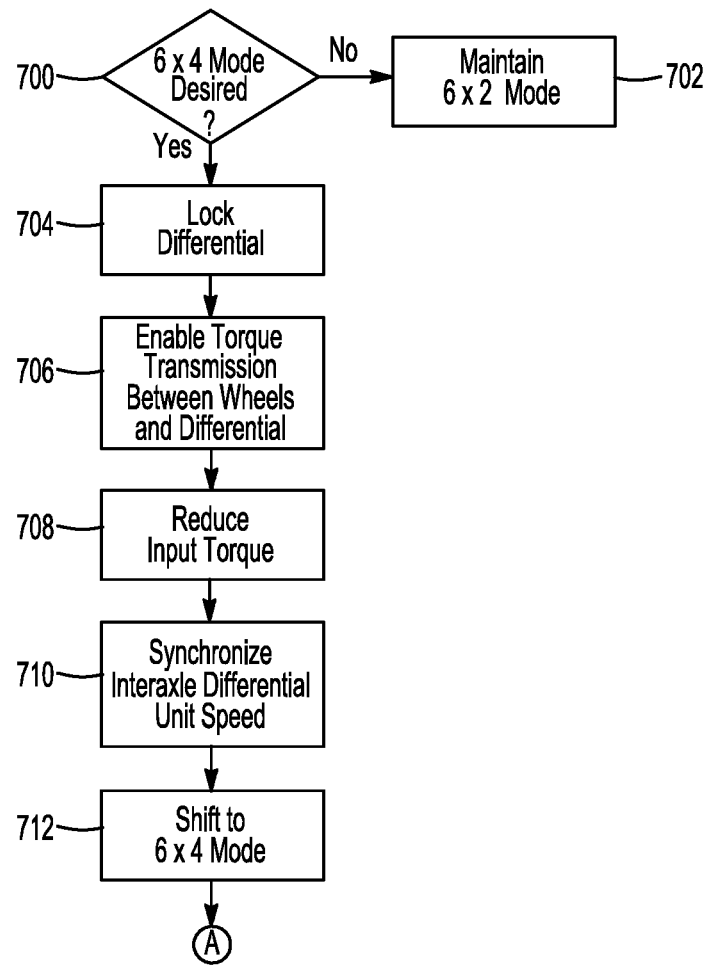
FIGS. 27 and 28 are a flowchart of a method of controlling the drive axle system to engage a four-wheel drive operating mode.
Figure 28:
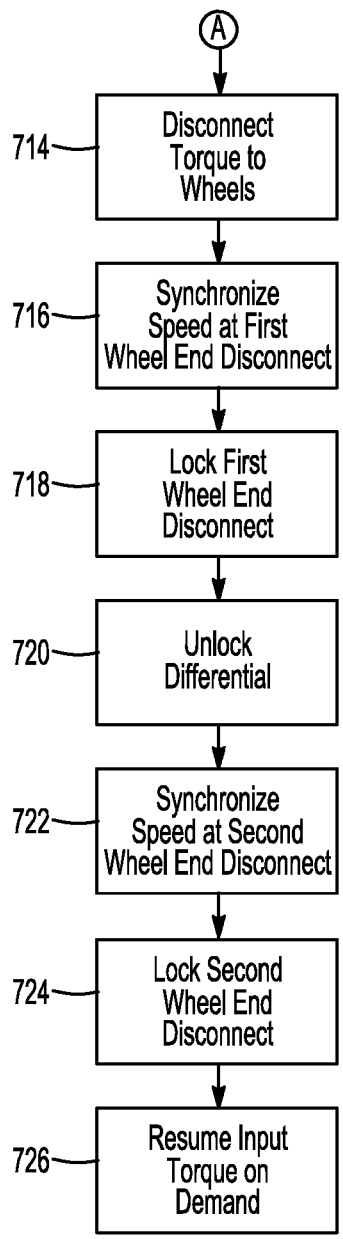

Referring to FIGS. 27 and 28, another flowchart associated with a method of controlling the drive axle system is shown. The methodology shown in these figures may represent steps associated with shifting from a two-wheel drive mode to a four-wheel drive mode in which propulsion torque is provided to the wheels of multiple drive axle assemblies. Discussion of FIGS. 27 and 28 will be described in the context of the drive axle system being initially in the two-wheel drive mode.

At block 700, the method may determine whether a four-wheel drive mode is desired. The determination of whether a four-wheel drive mode is desired may be manually or automatically determined. For example, a four-wheel drive mode may be manually selected based on an operator input, such as by actuating a switch to activating or requesting a shift to the four-wheel drive mode. The four-wheel drive mode may be automatically selected or activated by the control system 550. For example, a shift from the two-wheel drive mode to the four-wheel drive mode may be desired when one axle assembly cannot or may not be able to provide sufficient torque to provide a desired vehicle speed or accelerate the vehicle as requested, such as may be the case when the vehicle encounters or a steeper road grade, acceleration of a sufficient magnitude is requested, or combinations thereof. As an example, the control system 550 may automatically initiate a shift from the two-wheel drive mode to the four-wheel drive mode when the vehicle speed decreases by a predetermined amount with respect to a desired vehicle speed, road grade is greater than a predetermined road grade amount, the acceleration or torque requested by an operator or by a cruise control system is greater than a predetermined amount, or combinations thereof. If the four-wheel drive mode is not desired, then the method may continue at block 702. If the four-wheel drive mode is desired, then the method may continue at block 704.

At block 702, the two-wheel drive mode may be maintained and the method or iteration of the method may end.

At block 704, the differential of the disconnected drive axle assembly or drive axle assembly that is not transmitting torque to its wheel assemblies to propel the vehicle may be locked. Locking the differential 46 may result in the first axle shaft 48 and the second axle shaft 48 of that drive axle assembly being rotatable together about the second axis 100 or rotatable at a common speed about the second axis 100. The differential 46 may be locked using a differential lock in a manner known by those skilled in the art.

At block 706, the transmission of torque to the wheel assemblies of the disconnected drive axle assembly and its differential may be enabled. More specifically, the wheel end disconnects of the wheel end assemblies of a drive axle assembly may be operated to enable the transmission of torque between its differential 46 and its wheel assemblies 20. For example, a friction clutch 310 may be actuated to the engaged position and the locking clutch 312 may be kept in the unlocked position in a wheel end disconnect having the configuration shown in FIG. 20. As a result, the friction clutches 310 of the wheel end disconnects of the disconnected drive axle assembly may allow an associated wheel assembly 20 to "spin up" or increase the rotational velocity of the axle shafts 48 if the vehicle is in motion. In turn, the axle shafts 48 may "spin up" or increase the rotational velocity of its differential 46 and its associated drive pinion 36.

Optionally, this step may also include confirming whether engagement of the friction clutch 310 or the transmission of torque between a differential 46 to its wheel assemblies 20 has been successfully completed. For example, one or more sensors may be provided that may directly detect the position of the clutches or friction clutch 310 associated with a wheel end disconnect to confirm that sufficient clutch movement has occurred. As another example, one or more sensors may be provided that may indirectly determine whether sufficient clutch movement has occurred. For instance, a sensor may detect the pressure or current provided to an actuator that may actuate the clutches to indirectly determine whether sufficient clutch movement has occurred. As another example, one or more speed sensors, such as a speed sensor that may detect the rotational velocity of the drive pinion 36, differential 46, axle shafts 48, or combinations thereof, may be provided to detect a change in the rotational velocity to determine whether the wheel assembly 20 or hub assembly 308 has been connected to the differential 46.

At block 708, the input torque to the drive axle system may be reduced. The input torque to the drive axle system may be the torque that is provided by the torque source 18. The input torque may be reduced to reduce the torque on downstream components to facilitate actuation of the shift collar 44. The input torque to the drive axle system may be reduced in many ways. For example, output of the torque source 18 may be reduced, a transmission may be shifted to neutral, or a clutch disposed upstream from the drive axle system 12 may be opened. Such a clutch may be provided with the torque source 18 (e.g., an engine clutch or clutch that may disengage an engine crankshaft), between an engine and a transmission, or between the torque source 18 and the first drive axle assembly 14.

At block 710, the rotational speed at or across the interaxle differential unit may be synchronized or a synchronized rotational speed across the interaxle differential unit may be obtained. For example, the speed across the interaxle differential unit 42 may be adjusted if necessary to permit the shift collar 44 to be shifted. As an example, the rotational speed of the sun gear 170 of the interaxle differential unit 42 may be adjusted to match or be sufficiently close to the rotational speed of the drive pinion 36 to permit the shift collar 44 to move from the second position, in which the shift collar 44 does not operatively connect the sun gear 170 to the drive pinion 36, to the first position, in which the shift collar 44 operatively connects the sun gear 170 to the drive pinion 36 to enable or permit the transmission of torque from the interaxle differential unit 42 to the differential 46. Accordingly, the term "synchronized" may mean that the rotational speed of two components may be sufficiently close so as to permit the shift collar 44 to be shifted and may not require exactly the same rotational speed. The rotational speed at or across the interaxle differential unit 42 may be synchronized by adjusting the rotational speed of the input shaft 34, such as by increasing the rotational speed from the torque source 18 to sufficiently synchronize with the rotational speed of the drive pinion 36.

At block 712, the differential may be connected from the torque source. More specifically, the differential 46 of the drive axle assembly having the wheel end disconnects may be coupled from the torque source 18 so that torque can be transmitted to the differential 46. The differential 46 may be connected by actuating the shift collar 44 from the second position to the first position.

At block 714, the transmission of torque from the differential to its wheel assemblies of an axle assembly may be discontinued or disconnected. More specifically, the wheel end disconnects of the wheel end assemblies of a drive axle assembly may be operated to discontinue the transmission of torque from a corresponding differential 46 to its corresponding wheel assemblies 20. For example, a friction clutch 310 may be actuated back to the disengaged position and the locking clutch 312 may remain to the unlocked position in a wheel end disconnect having the configuration shown in FIG. 21. Optionally, this step may also include confirming whether the disconnection has been successfully obtained or completed in a similar manner as described with respect to block 606.

At block 716, the rotational speed at or across a first wheel end disconnect may be synchronized. For example, the speed across the first wheel end disconnect may be adjusted if necessary to permit a clutch, such as the locking clutch 312 to be shifted to the locked position. As an example, the torque provided to the differential 46 and hence to the first and second axle shafts 48, 48 may be adjusted to match or be sufficiently close to the rotational speed of the first hub assembly 308 to permit the friction clutch 310 to be actuated back to the engaged position and the locking clutch 312 to be actuated to the locked position as is best shown in FIG. 20. The term "synchronized" may mean that the rotational speed of two components may be sufficiently close so as to permit a shift, such as to permit the locking clutch 312 to be shifted, and may not require exactly the same rotational speed. The rotational speed at or across the first wheel end disconnect may be synchronized by adjusting the input torque or rotational speed from the torque source 18 or the transmission to increase or decrease the rotational velocity of the first axle shaft 48 to match or be sufficiently close to the rotational velocity of the first hub assembly 308.

At block 718, the first wheel end disconnect may be locked. In the configuration shown in FIG. 20, the first wheel end disconnect may be locked by actuating the friction clutch 310 to the engaged position and actuating the locking clutch 312 to the locked position. As a result, the first axle shaft 48 and the first hub assembly 308 may be rotatable together about the second axis 100. Optionally, this step may also include whether locking of the first wheel end disconnect has been successfully completed, such as by comparing the relative rotational velocity between the first hub assembly 308 and the first axle shaft 48.

At block 720, the differential may be locked. More specifically, the differential that was locked at block 704 may be unlocked to permit the first axle shaft 48 to be rotatable about the second axis 100 with respect to the second axle shaft 48. The differential 46 may be unlocked using a differential lock in a manner known by those skilled in the art. Optionally, the step may also include confirming whether the differential 46 has been successfully locked, such as by comparing the rotational velocities of the first axle shaft 48 and the second axle shaft 48 to confirm that the rotational velocities are the same or approximately the same.

At block 722, the rotational speed at or across the second wheel end disconnect may be synchronized. For example, the speed across the second wheel end disconnect may be adjusted if necessary to permit a clutch, such as the locking clutch 312, to be shifted to the locked position. As an example, the torque provided to the differential 46 and hence to the second axle shaft 48 may be adjusted to match or be sufficiently close to the rotational speed of the second hub assembly 308 to permit the friction clutch 310 of the second wheel end disconnect to be actuated back to the engaged position and the locking clutch 312 of the second wheel end disconnect to be actuated to the locked position as is best shown in FIG. 20. The rotational speed at or across the second wheel end disconnect may be synchronized by adjusting the input torque or rotational speed from the torque source or the transmission to increase or decrease the rotational velocity of the second axle shaft 48 to match or be sufficiently close to the rotational velocity of second first hub assembly 308.

At block 724, the second wheel end disconnect may be locked. In the configuration shown in FIG. 20, the second wheel end disconnect may be locked by actuating its friction clutch 310 to the engaged position and actuating its locking clutch 312 to the locked position. As a result, the second axle shaft 48 and the second hub assembly 308 may be rotatable together about the second axis 100. Optionally, this step may also include confirming whether engagement of one or more clutches, such as the friction clutch 310 and the locking clutch 312, has been successfully completed, such as by comparing the relative rotational velocity between the second hub assembly 308 and the second axle shaft 48.

At block 726, the transition to the four-wheel mode drive mode has been completed. The torque source 18 is operatively connected to the first and second drive axle assemblies and the wheel end disconnects permit the transmission of torque between the differentials and their associated wheel assemblies. As such, additional torque may be provided on demand to propel the vehicle as compared to the two-wheel drive mode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a drive axle system, the method comprising:
   providing an axle assembly having an interaxle differential unit, a shift collar, a differential, a wheel end assembly having a wheel end disconnect, and a wheel assembly;
   reducing an input torque to the interaxle differential unit that is operatively connectable to the differential with the shift collar;
   operating the wheel end disconnect to discontinue transmission of torque from the differential to the wheel assembly; and
   subsequently shifting the shift collar to discontinue transmission of torque to the differential.

2. The method of claim 1 further comprising transmitting torque to a wheel assembly of another axle assembly when the transmission of torque is discontinued to the differential.

3. The method of claim 1 further comprising determining whether the shift collar has successfully shifted to discontinue transmission of torque to the differential.

4. The method of claim 3 further comprising permitting the input torque to be increased if the shift collar has successfully shifted.

5. The method of claim 1 wherein the interaxle differential unit includes:
   a planet gear carrier that is rotatable about a first axis and receives the input torque;
   a planetary ring gear that is rotatable about the first axis with an output shaft;
   a sun gear that is rotatably disposed on a drive pinion that meshes with a ring gear of the differential; and
   a planet gear that is rotatably disposed on the planet gear carrier and meshes with the planetary ring gear and the sun gear; and
   wherein the shift collar that is is moveable along the first axis between a first position in which the shift collar operatively connects the sun gear to the drive pinion to transmit torque from the interaxle differential unit to the differential and a second position in which the shift collar does not operatively connect the sun gear to the drive pinion to discontinue transmission of torque to the differential.

6. The method of claim 5 further comprising transmitting torque to another axle assembly via the output shaft when the shift collar is in the second position.

7. The method of claim 5 further comprising synchronizing a rotational speed of the planet gear carrier and the sun gear before shifting the shift collar to discontinue transmission of torque to the differential.

8. The method of claim 1 wherein the wheel end assembly includes a locking clutch that is moveable between a locked position in which the locking clutch transmits torque to the wheel assembly and an unlocked position in which the locking clutch does not transmit torque to rotate the wheel assembly, and a friction clutch that is moveable between an engaged position in which torque is transmitted between the differential and the wheel assembly via the friction clutch and a disengaged position in which torque is not transmitted between the differential and the wheel assembly, wherein discontinuing transmission of torque from the differential to the wheel assembly includes actuating the locking clutch to the unlocked position and actuating the friction clutch to the disengaged position.

9. The method of claim 1 wherein the wheel end assembly includes a hub assembly that is rotatable about a second axis, an axle shaft that is received in the hub assembly and is rotatable about the second axis, a friction clutch that is moveable between an engaged position in which torque is transmitted between the axle shaft and the hub assembly via the friction clutch and a disengaged position in which torque is not transmitted between the axle shaft and the hub assembly via the friction clutch, and a locking clutch that is received in the hub assembly and that is rotatable about the second axis with the axle shaft, wherein the locking clutch is moveable between a locked position in which the locking clutch transmits torque to the hub assembly and an unlocked position in which the locking clutch does not transmit torque to rotate the hub assembly, wherein operating the wheel end disconnect to discontinue transmission of torque from the differential to the wheel assembly includes actuating the locking clutch to the unlocked position and actuating the friction clutch to the disengaged position.

10. A method of controlling a drive axle system, the method comprising:
   providing an axle assembly having an interaxle differential unit that is rotatable about a first axis, a shift collar, a differential, first and second axle shafts, a first wheel end assembly having a first wheel end disconnect and a first hub assembly, and a second wheel end assembly having a second wheel end disconnect and a second hub assembly;
   locking the differential such that the first and second axle shafts rotate together about a second axis;
   operating the first and second wheel end disconnects to enable torque transmission between the first and second hub assemblies and the differential;
   reducing an input torque to the interaxle differential unit that is operatively connectable to the differential with the shift collar; and
   shifting the shift collar to enable transmission of torque to the differential from the interaxle differential unit.

11. The method of claim 10 wherein operating the first and second wheel end disconnects to enable torque transmission between the first and second hub assemblies and the differential increases a rotational speed of the differential.

12. The method of claim 11 further comprising obtaining a synchronized rotational speed across the interaxle differential unit after reducing the input torque and before shifting the shift collar to enable transmission of torque to the differential from the interaxle differential unit.

13. The method of claim 12 wherein the interaxle differential unit includes:
a planet gear carrier that is rotatable about the first axis and receives the input torque;
a planetary ring gear that is rotatable about the first axis with an output shaft;
a sun gear that is rotatably disposed on a drive pinion that meshes with a ring gear of the differential; and
a planet gear that is rotatably disposed on the planet gear carrier and meshes with the planetary ring gear and the sun gear; and
wherein the shift collar is moveable along the first axis between a first position in which the shift collar operatively connects the sun gear to the drive pinion to transmit torque from the interaxle differential unit to the differential and a second position in which the shift collar does not operatively connect the sun gear to the drive pinion to discontinue transmission of torque to the differential, wherein shifting the shift collar to enable transmission of torque to the differential from the interaxle differential unit includes moving the shift collar from the second position to the first position.

14. The method of claim 12 further comprising operating the first and second wheel end disconnects to discontinue torque transmission between the differential and the first and second hub assemblies after obtaining the synchronized rotational speed across the interaxle differential unit.

15. The method of claim 14 further comprising synchronizing a rotational speed of the first axle shaft and the first hub assembly by adjusting torque provided to the differential from the interaxle differential unit.

16. The method of claim 15 further comprising locking the first wheel end disconnect such that the first axle shaft and the first hub assembly are rotatable together about the second axis after synchronizing the rotational speed of the first axle shaft and the first hub assembly.

17. The method of claim 16 wherein the first wheel end assembly has a locking clutch that is moveable between a locked position in which the locking clutch transmits torque to the first hub assembly and an unlocked position in which the locking clutch does not transmit torque to rotate the first hub assembly, and a friction clutch that is moveable between an engaged position in which torque is transmitted between the differential and the first hub assembly via the friction clutch and a disengaged position in which torque is not transmitted between the differential and the first hub assembly, wherein locking the first wheel end disconnect includes moving the friction clutch from the disengaged position to the engaged position and then moving the locking clutch to the locked position.

18. The method of claim 16 further comprising unlocking the differential such that the first and second axle shafts are rotatable with respect to each other about the second axis after locking the first wheel end disconnect.

19. The method of claim 18 further comprising synchronizing a rotational speed of the second axle shaft and the second hub assembly after unlocking the differential by adjusting torque provided to the differential from the interaxle differential unit.

20. The method of claim 19 further comprising locking the second wheel end disconnect such that the second axle shaft and the second hub assembly are rotatable together about the second axis after synchronizing the rotational speed of the second axle shaft and the second hub assembly.

* * * * *